(12) United States Patent
Takahashi et al.

(10) Patent No.: US 8,123,600 B2
(45) Date of Patent: Feb. 28, 2012

(54) STORAGE MEDIUM STORING GAME PROGRAM AND GAME APPARATUS

(75) Inventors: Hiroyuki Takahashi, Shinjuku-ku (JP);
Shugo Takahashi, Shinjuku-ku (JP);
Yusuke Sugimoto, Shinjuku-ku (JP);
Yutaka Yamamoto, Shinjuku-ku (JP);
Toshiharu Izuno, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 1308 days.

(21) Appl. No.: 11/123,211

(22) Filed: May 6, 2005

(65) Prior Publication Data

US 2005/0255900 A1      Nov. 17, 2005

(30) Foreign Application Priority Data

May 10, 2004   (JP) .................................. 2004-139729
Oct. 15, 2004   (JP) .................................. 2004-302280

(51) Int. Cl.
*A63F 13/00*   (2006.01)
(52) U.S. Cl. ................... 463/3; 463/30; 463/32; 463/20
(58) Field of Classification Search .................... 463/38, 463/3, 30, 37, 32, 20
See application file for complete search history.

(56) References Cited

U.S. PATENT DOCUMENTS

| | | | |
|---|---|---|---|
| 6,244,956 B1 * | 6/2001 | Nakayama et al. | 463/3 |
| 6,273,818 B1 * | 8/2001 | Komoto | 463/31 |
| 2003/0032478 A1 * | 2/2003 | Takahama et al. | 463/30 |
| 2004/0130567 A1 * | 7/2004 | Ekin et al. | 345/723 |
| 2004/0204239 A1 * | 10/2004 | Saikawa et al. | 463/30 |
| 2005/0255899 A1 * | 11/2005 | Takahashi et al. | 463/3 |

FOREIGN PATENT DOCUMENTS

| | | |
|---|---|---|
| JP | 2003-047766 A | 2/2003 |
| JP | 2003-175282 | 6/2003 |
| JP | 2003175282 A * | 6/2003 |
| JP | 2003-071134 A | 11/2003 |

OTHER PUBLICATIONS

Office Action in priority application JP2004-302280 issued Jan. 18, 2010.

* cited by examiner

*Primary Examiner* — Dmitry Suhol
*Assistant Examiner* — Brandon Gray
(74) *Attorney, Agent, or Firm* — Nixon & Vanderhye P.C.

(57) ABSTRACT

A game apparatus causes a character object to perform a first hitting motion on the necessary condition that a to-be-hit object is present in a first area 104a which is set based on a position of the character object in a virtual game space, and causes the character object to perform a second hitting motion on the necessary condition that the to-be-hit object is present in a second area 104b, 104c, or 104d. Furthermore, the game apparatus adjusts a position of at least one of at least a part of the character object and the to-be-hit object, such that when the character object is caused to perform the second hitting motion, the character object and the to-be-hit object are in a predetermined positional relationship.

14 Claims, 29 Drawing Sheets

FIG. 14

CHARACTER TABLE

| CHARACTER NAME | ABILITY VALUE | OFFENSIVE SS NAME | DEFENSIVE SS NAME |
|---|---|---|---|
| CHARACTER 1 | ... | SS1 | SS3 |
| CHARACTER 2 | ... | SS2 | SS4 |
| CHARACTER 3 | ... | SS6 | SS5 |
| CHARACTER 4 | ... | SS9 | SS7 |
| CHARACTER 5 | ... | SS8 | SS10 |

FIG. 15

SS TABLE

| SS NAME | JUDGMENT AREA | MOTION DETAILS | |
|---|---|---|---|
| | | CHARACTER | BALL |
| SS1 | JUDGMENT AREA A | SWINGING UP THE HAMMER AND HITTING THE BALL | AT A STOP |
| SS2 | JUDGMENT AREA A | SWINGING UP THE BAT AND HITTING THE BALL | AT A STOP |
| SS3 | JUDGMENT AREA B | MOVING TOWARD THE BALL WHILE SPINNING AND HITTING THE BALL | AT A STOP |
| SS4 | JUDGMENT AREA B | ASSUMING THE POSE, WAITING FOR THE BALL, AND HITTING THE BALL | STOPS, AND AFTER THE CHARACTER FINISHES ASSUMING THE POSE, MOVING TOWARD THE CHARACTER |
| SS5 | JUDGMENT AREA C | TRANSFORMED INTO A TURTLE, MOVING TOWARD THE BALL, AND HITTING THE BALL | AT A STOP |
| SS6 | JUDGMENT AREA D | ... | ... |
| SS7 | ALL THE AREAS | ... | ... |

FIG. 16

JUDGMENT AREA TABLE

| AREA NAME | AREA DEFINITION |
|---|---|
| USUAL SHOT AREA | IN AN XY PLANE INCLUDING THE CURRENT POSITION OF THE CHARACTER, AN ELLIPTICAL AREA HAVING ITS CENTER AT THE POSITION WHICH IS AWAY FROM THE CURRENT POSITION OF THE CHARACTER BY X1 IN THE X DIRECTION (IN + DIRECTION WHEN THE CHARACTER HOLDS THE RACKET ON ITS RIGHT, IN − DIRECTION WHEN THE CHARACTER HOLDS THE RACKET ON ITS LEFT) AND Y1 IN THE Y DIRECTION (+), WITH THE LONGER RADIUS OF R1 AND THE SHORTER RADIUS OF R2 |
| SS AREA A | IN AN XY PLANE INCLUDING THE CURRENT POSITION OF THE CHARACTER, AN ELLIPTICAL AREA HAVING ITS CENTER AT THE POSITION WHICH IS AWAY FROM THE CURRENT POSITION OF THE CHARACTER BY X2 IN THE X DIRECTION (IN + DIRECTION WHEN THE CHARACTER HOLDS THE RACKET ON ITS RIGHT, IN − DIRECTION WHEN THE CHARACTER HOLDS THE RACKET ON ITS LEFT) AND Y1 IN THE Y DIRECTION (+), WITH THE LONGER RADIUS OF R3 AND THE SHORTER RADIUS OF R4 |
| SS AREA B | IN A CYLINDER HAVING ITS CENTER AT THE CURRENT POSITION OF THE CHARACTER, WITH THE RADIUS OF THE BOTTOM SURFACE OF R5 AND THE HEIGHT OF H1 ($0 < Y < H1$), 1/4 CYLINDER with $X > 0$ AND $Z > 0$ WHEN THE CHARACTER HOLDS THE RACKET ON ITS RIGHT AND WITH $X < 0$ and $Z > 0$ WHEN THE CHARACTER HOLDS THE RACKET ON ITS LEFT |
| SS AREA C | CYLINDER HAVING ITS CENTER AT THE CURRENT POSITION OF THE CHARACTER, WITH THE RADIUS OF THE BOTTOM SURFACE OF R6 AND THE HEIGHT OF H2 ($0 < Y < H2$) |
| SS AREA D | AREA HAVING THE HEIGHT OF $0 < Y < H3$ |

FIG. 17
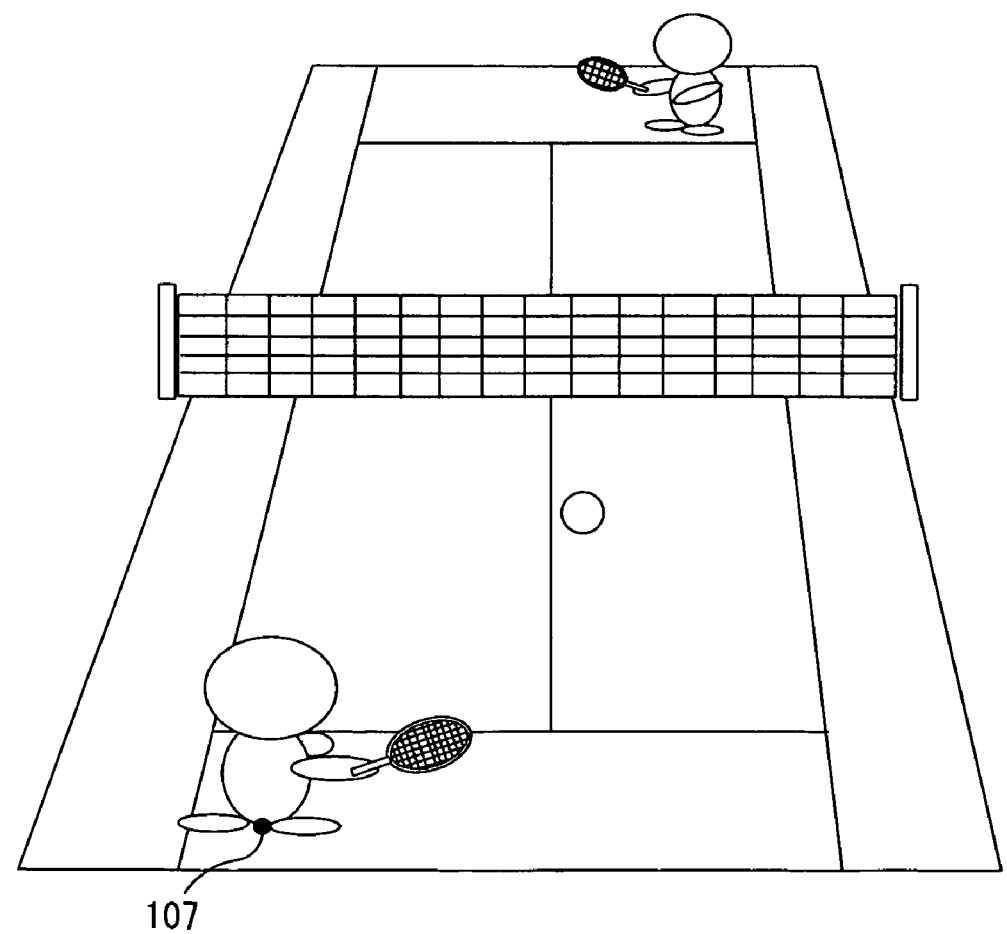
107
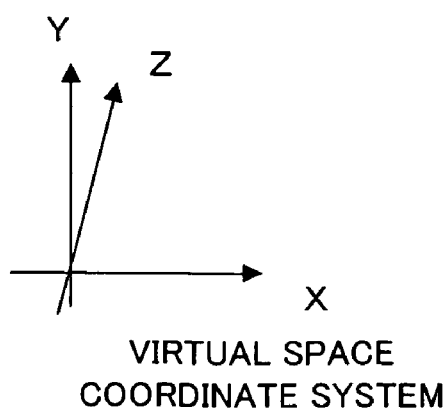
VIRTUAL SPACE
COORDINATE SYSTEM

USUAL SHOT AREA

SS AREA B

SS AREA C

FIG. 22

VIRTUAL CAMERA CONTROL TABLE

| SS NAME | TIMING TO SWITCH THE CAMERA SETTING |
|---------|--------------------------------------|
| SS1 | WHEN FINISHING THE SUB MOTION OF SWINGING UP THE HAMMER |
| SS2 | WHEN FINISHING THE SUB MOTION OF SWINGING UP THE BAT |
| SS3 | WHEN MOVING BY A PREDETERMINED DISTANCE WHILE SPINNING |
| SS4 | WHEN FINISHING THE SUB MOTION OF ASSUMING THE POSE |
| SS5 | WHEN FINISHING THE SUB MOTION OF BEING TRANSFORMED TO A TURTLE |
| SS6 | ... |
| SS7 | ... |

FIG. 24

SS EFFECT TABLE

| SS NAME | BALL PARAMETER | | |
|---|---|---|---|
| | INITIAL SPEED | INITIAL DIRECTION | SPIN |
| SS1 | USUAL SHOT × 2 | SAME AS USUAL SHOT | SAME AS USUAL SHOT |
| SS2 | SAME AS USUAL SHOT | UPWARD | DROPPING WHILE SPINNING |
| SS3 | SAME AS USUAL SHOT | | |
| SS4 | SAME AS USUAL SHOT | | |
| SS5 | SAME AS USUAL SHOT | | |
| SS6 | SAME AS USUAL SHOT | | |
| SS7 | SAME AS USUAL SHOT | | |

STORAGE MEDIUM STORING GAME PROGRAM AND GAME APPARATUS

TECHNICAL FIELD

The exemplary embodiments disclosed herein relate to a storage medium which stores a game program and a game apparatus, and more specifically to a storage medium which stores a game program for causing a character object appearing in a virtual game space to perform a hitting motion on an object to be hit (for example, a ball; referred to as a "to-be-hit object") as in a tennis game, and a game apparatus.

BACKGROUND AND SUMMARY

Conventionally, there are games which proceed by causing a character appearing in a virtual game space to perform a hitting motion on a ball and causing the ball to move in accordance with the hitting motion. For example, Japanese Laid-Open Patent Publication No. 2003-175282 discloses a game apparatus by which a virtual tennis game is played in a virtual game space. In this tennis game, a character as a tennis player can present a killer shot which provides a different type of effect from the effect provided by a usual shot. A killer shot is, for example, a shot to return the ball faster than usual or a shot to return the ball in a course curved more than usual.

In a game for causing a character to perform a shot motion (hitting motion) as described above, it is assumed that a judgment area is set around the character. A judgment area is an area in which a shot motion is considered to be performable. Namely, when the ball is present in the judgment area, the ball can be returned by a shot motion. By contrast, when the ball is not present in the judgment area, the ball cannot be returned, i.e., no shot motion is performable. Such a judgment area is usually set in the vicinity of the character performing a shot motion, such that the shot motion appears natural. For example, in the case of a tennis game, a position at which the character swings the racket is set as the judgment area.

Japanese Laid-Open Patent Publication No. 2003-175282 does not disclose the judgment area. In the conventional game disclosed by Japanese Laid-Open Patent Publication No. 2003-175282, it is considered that an identical judgment area is set both for a usual shot motion and a killer shot as mentioned above. In the conventional game, a killer shot is a variant of a usual return shot, which is merely different in terms of the speed or the course of the ball. Thus, there is a limit in the variation of the killer shot. As a result, the game is too simple and the players may easily lose interest in the game.

Therefore, a feature of certain exemplary embodiments is to provide a game program and a game apparatus capable of widening the variation of the shot motion in a game in which a character performs a shot motion.

Certain exemplary embodiments have the following aspects to attain the feature mentioned above. The reference numerals, additional explanations and the like in parentheses indicate the correspondence with the examples described later for easier understanding of certain exemplary embodiments and do not limit these certain exemplary embodiments in any way.

A first aspect of certain exemplary embodiments is directed to a storage medium which stores a game program for causing a computer (CPU 22, etc.), of a game apparatus for causing a character object (100 and 101) appearing in a virtual game space to perform a hitting motion (shot motion, shoot motion) on a to-be-hit object (ball 102) so as to move the to-be-hit object in the virtual game space, to act as the following means.

The computer of the game apparatus acts as first motion means (S95), second motion means (S33) and adjustment means (S107 and/or 5109). The first motion means causes the character object to perform a first hitting motion (usual shot motion) on the necessary condition that the to-be-hit object is present in a first area (104*a*) which is set based on a position of the character object in the virtual game space. The second motion means causes the character object to perform a second hitting motion (special shot motion), which is different from the first hitting motion, on the necessary condition that the to-be-hit object is present in a second area (104*b*, 104*c*, 104*d*) which is set based on the position of the character object in the virtual game space, the second area being different from the first area. The adjustment means adjusts a position of at least one of at least a part of the character object (character 100 or racket 101) and the to-be-hit object, such that when the character object is caused to perform the second hitting motion, at least the part of the character object and the to-be-hit object are in a predetermined positional relationship. When adjusting the position of the character object, the position of the entire character object (character 100 and racket 101) may be adjusted, or the position of only a part of the character object (only racket 101) may be adjusted. The position of only the character object may be adjusted, only the position of the to-be-hit object may be adjusted, or the positions of both of the character object and the to-be-hit object may be adjusted.

In a game of causing the character object to move in the virtual game space based on an instruction to move from the operation means, the processing of adjusting the position of the character object by the adjustment means is automatically executed by a program, not based on the instruction to move.

In a second aspect of certain exemplary embodiments, the game program may cause the computer to act further as hitting determination means (S77, S81, S85, S87) and first stopping means (S91). The hitting determination means determines whether or not the character object should perform the second hitting motion. The first stopping means, when it is determined that the character object should perform the second hitting motion by the hitting determination means, temporarily stops a motion of at least the to-be-hit object. The adjustment means adjusts the position by moving (SS time motions) at least the part of the character object while the motion of the first to-be-hit object is at a stop by the first stopping means.

In a third aspect of certain exemplary embodiments, the game program may cause the computer to act further as hitting determination means (S77, S81, S85, S87) and second stopping means (S91). The hitting determination means determines whether or not the character object should perform the second hitting motion. The second stopping means, when it is determined that the character object should perform the second hitting motion by the hitting determination means, temporarily stops a motion of objects other than the to-be-hit object. The adjustment means adjusts the position by moving the to-be-hit object while the motion of the objects other than the to-be-hit object are at a stop by the second stopping means.

In a fourth aspect of certain exemplary embodiments, the game program may cause the computer to act further as hitting determination means (S77, S81, S85, S87) and third stopping means (S91). The hitting determination means determines whether or not the character object should perform the second hitting motion. The third stopping means for, when it is determined that the character object should perform the second hitting motion by the hitting determination means, temporarily stops a motion of objects other than the character object and the to-be-hit object. The adjustment means adjusts the position by moving at least the part of the character object and the to-be-hit object while the motion of the objects other than the character object and the to-be-hit object are at a stop by the third stopping means.

In a fifth aspect of certain exemplary embodiments, the second area may encompass an area which is not encompassed in the first area. The second area may encompass the entirety of the first area and also an area which is not encompassed in the first area. The second area may encompass a part of the first area and also an area which is not encompassed in the first area. The second area may encompass an area which is not encompassed in the first area without encompassing the first area.

In a sixth aspect of certain exemplary embodiments, the character object may include a human object (character) and a hitting object that the human object has (racket). The adjustment means moves the hitting object such that the hitting object contacts the to-be-hit object.

In a seventh aspect of certain exemplary embodiments, in response to a predetermined operation performed on operation means (controller 20) included in the game apparatus, the second motion means may cause the character object to perform the second hitting motion on the condition that the to-be-hit object is present in the second area when and after the predetermined operation is performed.

In an eighth aspect of certain exemplary embodiments, the second hitting motion may be performable only when a predetermined parameter (SS gauge) on the character object fulfills a predetermined condition. The game program causes the computer to act further as first control means (S49). The first control means controls the second motion means and the first motion means such that, in response to a predetermined operation performed on operation means included in the game apparatus, when the predetermined condition is fulfilled, the second motion means executes processing of causing the character object to perform the secondhitting motion, whereas when the predetermined condition is not fulfilled, the first motion means executes processing of causing the character object to perform the first hitting motion.

In a ninth aspect of certain exemplary embodiments, the second hitting motion may be performable only when a predetermined parameter on the character object fulfills a predetermined condition. The game program causes the computer to act further as mode setting means (S1), second control means (S49), and third control means (S57). The mode setting means allows a player to set, or automatically sets, a first mode (simple mode) or a second mode (normal mode). The second control means controls the second motion means and the first motion means such that, in the state where the first mode is set by the mode setting means, in response to a first operation (operation of A button) performed on operation means included in the game apparatus, when the predetermined condition is fulfilled, the second motion means executes processing of causing the character object to perform the second hitting motion, whereas when the predetermined condition is not fulfilled, the first motion means executes processing of causing the character object to perform the first hitting motion. The third control means controls the first motion means and the second motion means such that, in the state where the second mode is set by the mode setting means, in response to the first operation (operation of A button) performed on the operation means included in the game apparatus, the first motion means executes processing of causing the character object to perform the first hitting motion, whereas in response to a second operation (operation of R button and A button), which is different from the first operation, performed on the operation means included in the game apparatus, the second motion means executes processing of causing the character object to perform the second hitting motion.

In a tenth aspect of certain exemplary embodiments, the game program may cause the computer to act further as first determination means (S85) and second determination means (S85). The first determination means determines whether or not the to-be-hit object is present in one of first area and the second area, in response to a predetermined operation performed on operation means included in the game apparatus. When it is determined that the to-be-hit object is not present in the one of first area and the second area by the first determination means, the second determination means determines whether or not the to-be-hit object is present in the other of the first area and the second area. When it is determined that the to-be-hit object is present in the first area by the first determination means or the second determination means, the first motion means causes the character object to perform the first hitting motion. When it is determined that the to-be-hit object is present in the second area by the first determination means or the second determination means, the second motion means causes the character object to perform the second hitting motion.

In an eleventh aspect of certain exemplary embodiments, the game program may cause the computer to act further as third motion means (S33), third determination means (S85), and fourth determination means (S85). The third motion means causes the character object to perform a third hitting motion (defensive special shot motion) which is different from the first hitting motion and the second hitting motion (offensive special shot motion), on the necessary condition that the to-be-hit object is present in a third area (104*c* and 104*d*) which is set based on the position of the character object in the virtual game space. The third determination means determines whether or not the to-be-hit object is present in one of the second area (104*b*) and the third area (104*c* and 104*d*), in response to a predetermined operation performed on operation means included in the game apparatus. When it is determined that the to-be-hit object is not present in the one of second area and the third area by the third determination means, the fourth determination means determines whether or not the to-be-hit object is present in the other of the second area and the third area. When it is determined that the to-be-hit object is present in the second area by the third determination means or the fourth determination means, the second motion means causes the character object to perform the second hitting motion. When it is determined that the to-be-hit object is present in the third area by the third determination means or the fourth determination means, the third motion means causes the character object to perform the third hitting motion. The adjustment means adjusts a position of at least one of at least a part of the character object and the to-be-hit object, such that when the character object is caused to perform the third hitting motion, at least the part of the character object and the to-be-hit object are in a predetermined positional relationship.

Certain exemplary embodiments may be provided in the form of a game apparatus having functions realized by the above-described game program.

According to the first aspect of certain exemplary embodiments, the character object can be caused to perform a plurality of hitting motions having different judgment areas. Therefore, the variation of the hitting motion can be widened. Since the character object and the to-be-hit object are adjusted so as to be in a predetermined positional relationship, the second area can be set to include an area far from the character object. Namely, since the character object can perform a hitting motion on the to-be-hit object at a position far from the character object, the character object can perform an unexpected hitting motion.

According to the second aspect of certain exemplary embodiments, the motions of the objects other than the character object performing the second hitting motion are at a stop. Thus, there is no time limit in the motion of the character object for positional adjustment. For example, it is assumed that for the second hitting motion, the position of the character object is adjusted from the state where the character object is far from the to-be-hit object. In this case, if the motions of the other objects are not stopped, the positional adjustment should be performed by moving the character object at a high speed. By contrast, according to the second aspect, the motions of the other objects are stopped. Therefore, it is not necessary to move the character object at a high speed, and the character object can be moved with a sufficient length of time. In the case where the character object performs an eye-catching motion while the positional adjustment is being made, such a motion can be freely set with no restriction on time. Therefore, the motion can be made dramatic and entertaining. Thus, the game can be made more amusing.

According to the third aspect of certain exemplary embodiments, the movement of only the to-be-hit object can be represented because the motions of the other objects are at a stop. The movement of the to-be-hit object for positional adjustment can be freely set with no restriction on time, and it is not necessary to move the to-be-hit object at a high speed. In the case where the to-be-hit object performs an eye-catching motion, such an motion can be made dramatic and entertaining.

According to the fourth aspect of certain exemplary embodiments, the character object and the to-be-hit object can be moved with a sufficient length of time since the motions of the other objects are at a stop. The motions of the character object and the to-be-hit object for positional adjustment can be freely set with no restriction on time, and it is not necessary to move these objects at a high speed. In the case where these objects perform an eye-catching motion, such an motion can be made dramatic and entertaining.

According to the fifth aspect of certain exemplary embodiments, the character object can be caused to perform a hitting motion even when the to-be-hit object is at a position at which the to-be-hit object could not be hit by the first hitting motion.

According to the sixth aspect of certain exemplary embodiments, a highly dramatic hitting motion can be provided; for example, the character object throws a hitting object such as a racket and then hits the to-be-hit object.

According to the seventh aspect of certain exemplary embodiments, there is provided a tolerance in timing for performing a predetermined operation for the second hitting motion. Therefore, the player does not need to perform the operations at a strictly accurate timing. Since the hitting motion can be provided easily, even a beginner can enjoy the game easily. An advanced level player can concentrate on the factors other than the operation timing, such as the type or the course of the shot, and thus can enjoy the game in a different way from the beginner.

According to the eighth aspect of certain exemplary embodiments, the first hitting motion and the second hitting motion can be performed by the same operation. Therefore, the game operations can be made easier.

According to the ninth aspect of certain exemplary embodiments, a first mode in which the hitting motion is relatively easy and a second mode in which the hitting motion is relatively difficult are prepared. Therefore, the level of the operation for the hitting motions can be changed.

According to the tenth or eleventh aspect of certain exemplary embodiments, the player can provide two types of hitting motions having different judgment areas with one type of operation. In addition, even if one of the hitting motions is impossible, if the other hitting motion is possible, the possible hitting motion is provided. Therefore, the player can operate the two types of hitting motions more easily.

These and other features, aspects and advantages of certain exemplary embodiments will become more apparent from the following detailed description of the exemplary embodiments when taken in conjunction with the accompanying drawings.

BRIEF DESCRIPTION OF THE DRAWINGS

FIG. 14 shows a character table;

FIG. 15 show a special shot table;

FIG. 16 shows a judgment area table;

FIG. 17 illustrates the definition of a game space coordinate system;

FIG. 22 shows a virtual camera control table;

FIG. 24 shows an SS effect table;

DETAILED DESCRIPTION

Figure 1:
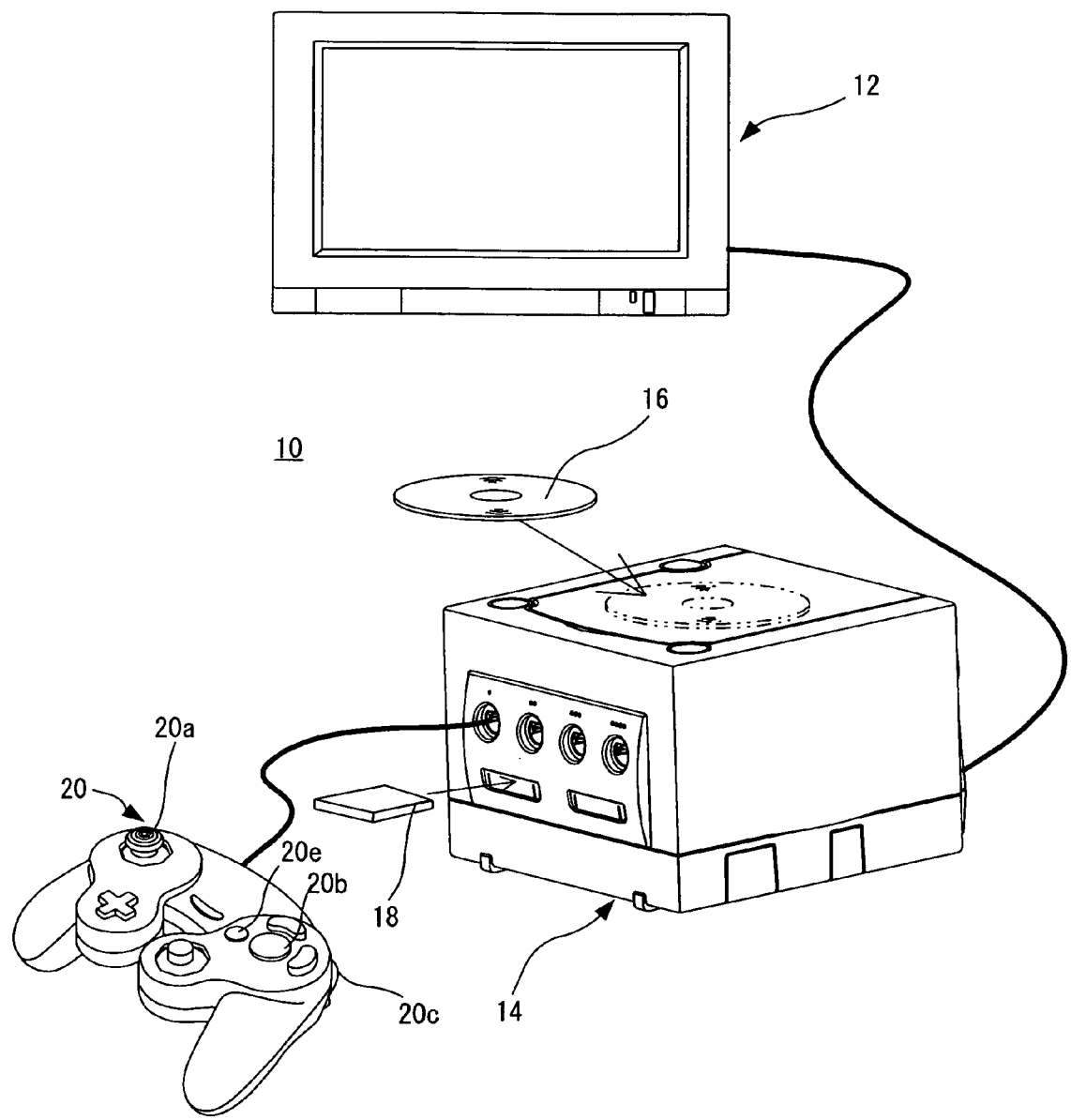
FIG. 1 is an external view showing a structure of a game system according to one exemplary embodiment.
Figure 2:
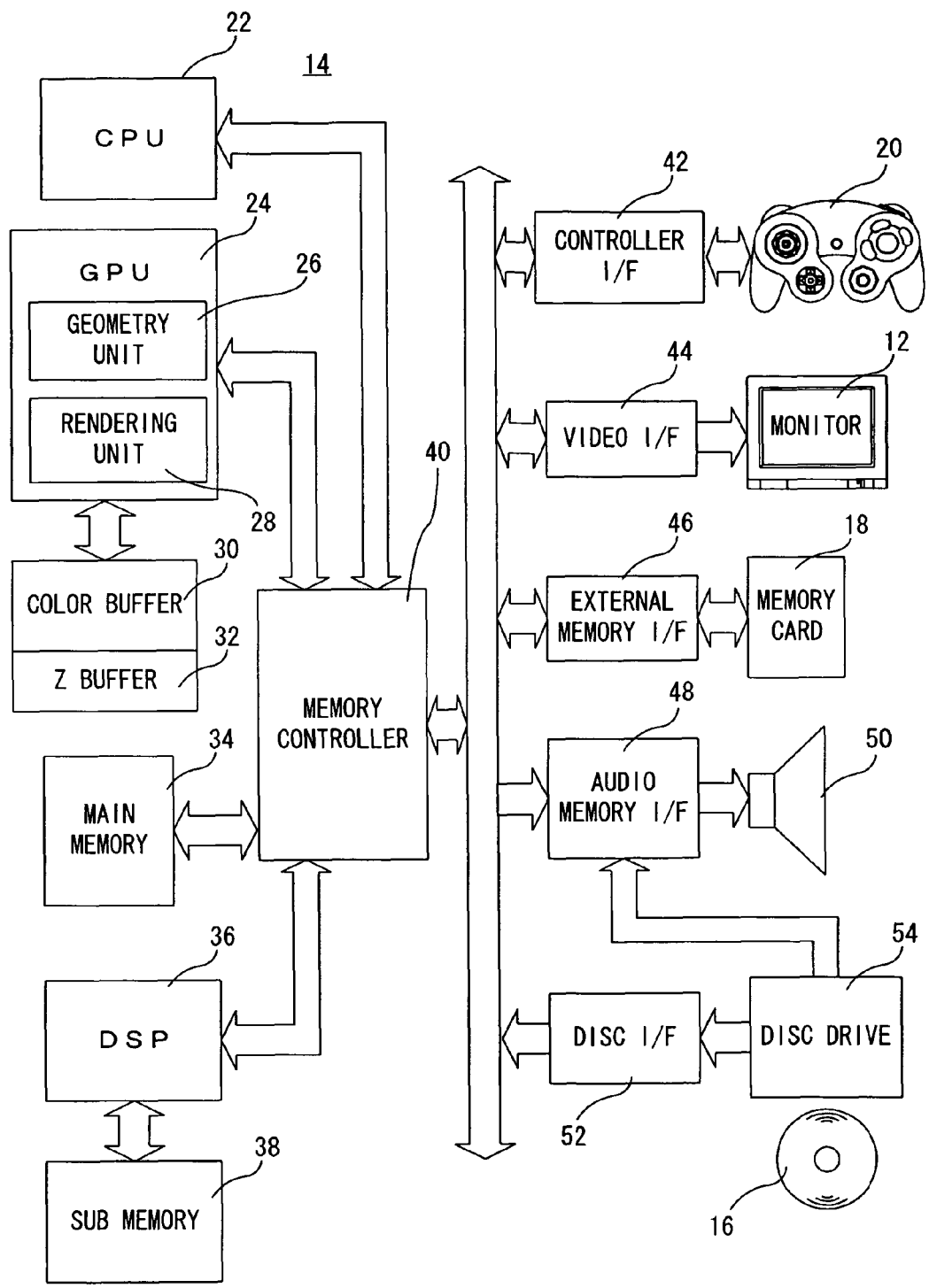
FIG. 2 is a block diagram of the game system shown in FIG. 1.

FIG. 1 is an external view showing a structure of a game system according to one exemplary embodiment, and FIG. 2 is a block diagram thereof. As shown in FIG. 1 and FIG. 2, the game system includes a game apparatus 14, an optical disc 16, a memory card 18, a controller 20, and a TV 12 (including a speaker 50 shown in FIG. 2). The optical disc 16 and the memory card 18 are detachably mounted on the game apparatus 14. The controller 20 is connected to either one of a plurality of (four in FIG. 1) connectors for controller ports in the game apparatus 14. The controller 20 includes a plurality of operation sections, and specifically includes a joystick 20a, an A button 20b, an R button 20c, a B button 20e, a Z button (not shown) and the like. In other exemplary embodiments, the game apparatus 14 and the controller 20 may communicate each other wirelessly without using a communication cable. The TV 12 and the speaker 50 are connected to the game apparatus 14 via an AV cable or the like. The exemplary embodiments described herein are not limited to a stationary game apparatus as shown in FIG. 1, and is applicable to a mobile game apparatus, an industrial game apparatus, or an apparatus capable of performing a game in a cellular phone, personal computer or the like, needless to say. Hereinafter, with reference to FIG. 2, each element of the game system according to certain exemplary embodiments will be described in detail and general operations of the game system will be described.

The optical disc 16 as an exemplary external storage medium is, for example, a DVD-ROM and fixedly stores a game program and data on a game such as character data and the like. Before a player plays the game, the optical disc 16 is mounted on the game apparatus 14. Means for storing the game program and the like is not limited to a DVD-ROM, and may be a storage medium such as a CD-ROM, an MO, a memory card, a ROM cartridge or the like. Alternatively, the game program and the like may be stored in storage means in the game apparatus such as a memory, a hard disc or the like. In this case, a game program may be downloaded by communication. The memory card 18 is formed of a rewritable storage medium such as, for example, a flash memory, and stores data such as save data and the like in the game, for example.

The game apparatus 14 reads the game program stored on the optical disc 16 and performs game processing. The controller 20 is an input device for allowing the player to input data for the game operations. As described above, the controller 20 includes the joystick 20a and a plurality of operation switches. The controller 20 outputs operation data to the game apparatus 14 in accordance with, for example, the type of operation performed on the joystick 20a by the player or the operation switch pressed by the player. The TV 12 displays image data which is output from the game apparatus 14 on a screen. The speaker 50 is typically built in the TV 12, and outputs audio data of the game which is output from the game apparatus 14. When a plurality of players play the game, a number of controllers 20 corresponding to the number of the players are provided.

Next, the structure of the game apparatus 14 will be described. As shown in FIG. 2, the game apparatus 14 includes a CPU 22 and a memory controller 40 connected to the CPU 22. In the game apparatus 14, the memory controller 40 is connected to a graphics processing unit (GPU) 24, a main memory 34, a digital signal processing circuit (DSP) 36, and various interfaces (I/F) 42 through 52. The main memory 40 is also connected to a sub memory 38 via the DSP 36. The memory controller 40 controls data transfer between these elements in the game apparatus 14.

For starting the game, a disc drive 54 first drives the optical disc 16 mounted on the game apparatus 14. The game program stored on the optical disc 16 is read to the main memory 34 via a disc I/F 52 and the memory controller 40. The game is started by the CPU 22 executing the program on the main memory 34. After the game is started, the players input data on game operations to the controller 20 using the joystick 20a or the operation switches. In accordance with the inputs from the player, the controller 20 outputs the operation data to the game apparatus 14. The operation data which is output from the controller 20 is input to the CPU 22 via a controller I/F 42 and the memory controller 40. The CPU 22 performs game processing in accordance with the input operation data. For generating image data or the like in the game processing, the GPU 24 or the DSP 36 are used. The sub memory 38 is used by the DSP 36 for performing predetermined processing.

The GPU 24 includes a geometry unit 26 and a rendering unit 28, and is connected to a memory specialized for image processing. The memory specialized for image processing is used as, for example, a color buffer 30 or a Z buffer 32. The geometry unit 26 performs calculation processing on coordinates of a 3D model (for example, an object formed of a polygon) regarding an object or graphics located in a game space, which is a virtual 3D space. For example, the geometry unit 26 rotates, enlarges or reduces, and deforms a 3D model, and converts the coordinates thereof of a world coordinate system into coordinates in a viewpoint coordinate system or a screen coordinate system. The rendering unit 28 writes color data (RGB data) of each pixel of a 3D model projected on the screen coordinate system into the color buffer 30 based on a predetermined texture, and thus generates a game image. The color buffer 30 is a memory area saved for maintaining game image data (RGB data) generated by the rendering unit 28. The Z buffer 32 is a memory area saved for maintaining depth information from the viewpoint when 3D viewpoint coordinates are converted into 2D screen coordinates. The GPU 24 generates image data to be displayed on the TV 12 using the geometry unit 26 and the rendering unit 28, and outputs the generated image data to the TV 12 via the memory controller 40 and a video I/F 44 when necessary. Audio data, which is generated by the CPU 22 when the game program is executed, is output to the speaker 50 via the memory controller 40 and an audio I/F 48. In this exemplary embodiment, the memory specialized for image processing is hardware which is separately provided. The certain exemplary embodiments described herein are not limited to this, and a method of using a part of the main memory 34 as a memory for image processing (UMA: Unified Memory Architecture) may be used, for example. The game apparatus 14 transfers the game data generated by executing the game program to the memory card 18 via the memory controller 40 and a memory I/F 46. Before the game is started, the game apparatus 14 reads the game data stored on the memory card 18 to the main memory 34 via the memory controller 40 and the memory I/F 46.

Figure 3:
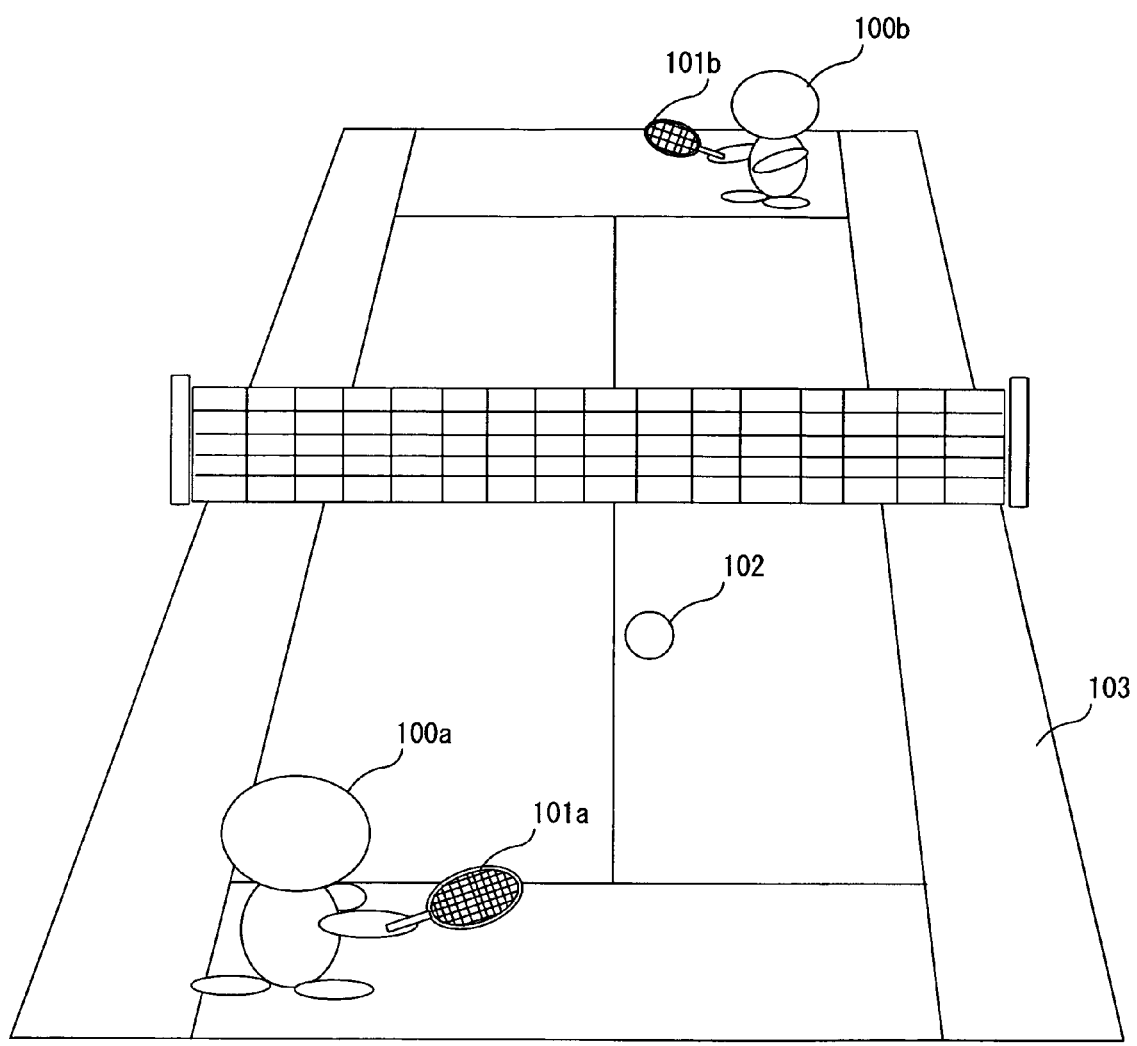
FIG. 3 shows an exemplary game image of a tennis game in this embodiment.

Next, with reference to FIG. 3 through FIG. 13, the overview of the game in this exemplary embodiment will be described. The game in this exemplary embodiment is a tennis game in which tennis is virtually played. FIG. 3 shows an exemplary game image which represents a virtual space for the tennis game in this exemplary embodiment.

With reference to FIG. 3, the virtual space includes character objects 100a and 100b, a ball object 102, and a tennis court object 103. The character object 100a includes a racket object 101a, and the character object 100b includes a racket object 101b. These objects are shot by a virtual camera, and thus are displayed on the TV 12 as a game image. Hereinafter, the character objects will be referred to as "characters", the racket objects will be referred to as "rackets", and the tennis court object will be referred to as a "tennis court". When it is not necessary to distinguish one by one, the characters 100a and 100b will be referred to as the "character 100", and the rackets 101a and 101b will be referred to as the "racket 101".

Each player operates the controller 20 to control the character 100a or 100b. Specifically, the player operates the joystick 20a of the controller 20 to move the character 100a or 100b in the virtual space, and operates the A button 20b to hit and return the ball 102 to the court of the opponent. The player may operate the joystick 20a together with the A button 20b to change the moving direction of the ball 102 which has been hit by a shot motion. The player may operate the A button 20b a plurality of times or operate another operation button successively after operating the A button 20b to change the type of shot (top spin, slice spin, lob, drop shot, or smash). Depending on the properties of the character, the player may change the moving speed or course of the ball 102 which has been hit by a shot motion. By such operations, the character 100 performs a shot motion, and moving parameters of the ball 102 are determined in accordance with the type or timing of the operation at the time of the shot motion.

The game proceeds similarly to an actual tennis game. Namely, the serving side first performs a service motion, and then the balls are alternately hit between the two sides. When either side scores, scoring processing is performed and this is repeated until the game is over.

In this exemplary embodiment, two controllers 20 are connected to the game apparatus 14, such that two players play the respective controllers 20 to operate the characters 100a and 100b respectively. Alternatively, one of the characters 100a and 100b may be controlled by the computer.

In this exemplary embodiment, a so-called singles match played by two characters will be described as an example, but the exemplary embodiments described herein are also applicable to a so-called doubles match. In this case, four characters play a tennis game. At least one of the characters 100 needs to be operated by the player, and the other characters 100 may be controlled by the computer.

In a tennis game in this exemplary embodiment, each character 100 may make a usual shot and a special shot. A special shot is a shot which is set for each character and provides a special effect as compared to the usual shot.

Figure 4:
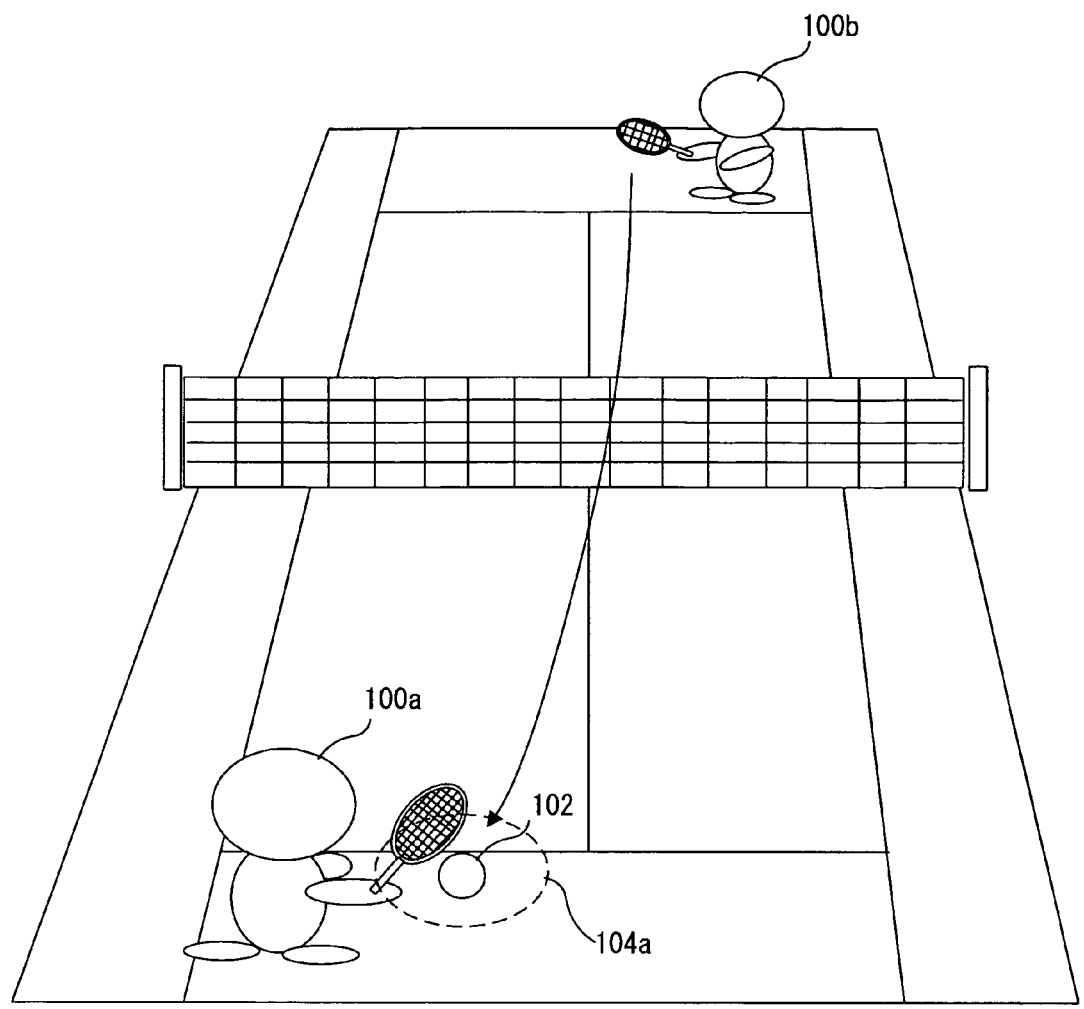
FIG. 4 shows an exemplary game image in which a character 100 performs a usual shot motion.

FIG. 4 shows an exemplary game image in which the character 100a performs a usual shot motion. In the virtual space, a judgment area 104a is set based on the position of the character 100a. (When the character 100a holds the racket 101a on its right, the judgment area 104a is set at a position which is away from the character 100a to its right by a predetermined distance; and when character 100a holds the racket 101a on its left, the judgment area 104a is set at a position which is away from the character 100a to its left by a predetermined distance.) The judgment area 104a is set for internal processing and is not displayed in the game image. This is also applied to judgment areas 104b through 104d described later.

When the ball 102 hit by a shot motion of the character 100b comes within the judgment area 104a, the character 100a performs the usual shot motion. The player operating the character 100a may operate the A button 20b at the time when the ball 102 comes within the judgment area 104a, but alternatively may operate the A button 20b any time after the character 102b hits the ball (i.e., in the state where the character 100a is to hit the ball next), even before the ball 102 comes in the judgment area 104a. In this case, the character 100a does not perform a shot motion at the time when the A button 20b is hit, but performs a shot motion later when the ball 102 comes within the judgment area 104a even without the player operating the A button 20b anymore. In the case where the ball 102 is already in the judgment area 104a at the time when the A button 20b is operated, the shot motion is performed immediately after the A button 20a is operated. By this setting, there is some tolerance in the timing at which the player can operate the A button 20b and thus the shot can be successful even if the player does not operate the A button 20b at a precisely accurate timing. This allows a beginner to make a successful shot easily. This also allows an advanced level player to concentrate on other factors (for example, the type of shot or the course of the ball), not on the operation timing, and enjoy the tactics and the interaction with the opponent.

FIG. 5 through FIG. 12C illustrate special shots. As described above, a special shot, provided for each character, is different from the usual shot and has a killer factor.

Special shots are classified into offensive special shots and defensive special shots. The former includes, for example, a fast shot (by which the ball moves at a high speed) which cannot be realized by the usual shot and a breaking ball shot (by which the course of the ball changes). For the latter, a wide judgment area is set. The latter includes, for example, a return shot made by the character 100 after catching up with the ball 102 which usually could not be caught up with by the character 100 due to a long distance between the position of the character 100 and the ball 102, resulting in a loss of a point. The ball 102 cannot be caught up with, for example, when the lobbing ball hit by the opponent character 100 drops closer to the baseline whereas the player's own character 100 is close to the net, or when the ball 102 hit by the opponent character 100 drops on a right corner of the court whereas the player's own character 100 is on a left corner of the court. For each character 100, two types of special shots, i.e., one type of offensive special shot and one type of defensive special shot, are assigned.

The usual shot is made by operating the A button 20b, and an offensive special shot is made by operating the A button 20b while operating the R button 20c. Namely, an offensive special shot can be made by pressing the A button 20b while pressing the R button 20c. A defensive special shot is made by operating the B button 20e while operating the R button 20c.

It can be set such that each time the R button 20c is operated, the usual shot and a special shot are alternately selected. In this case, when the A button 20b is operated while the usual shot is selected, the usual shot is made. When the A button 20b is operated while a special shot is selected, the special shot (offensive or defensive) is made.

Figure 5:
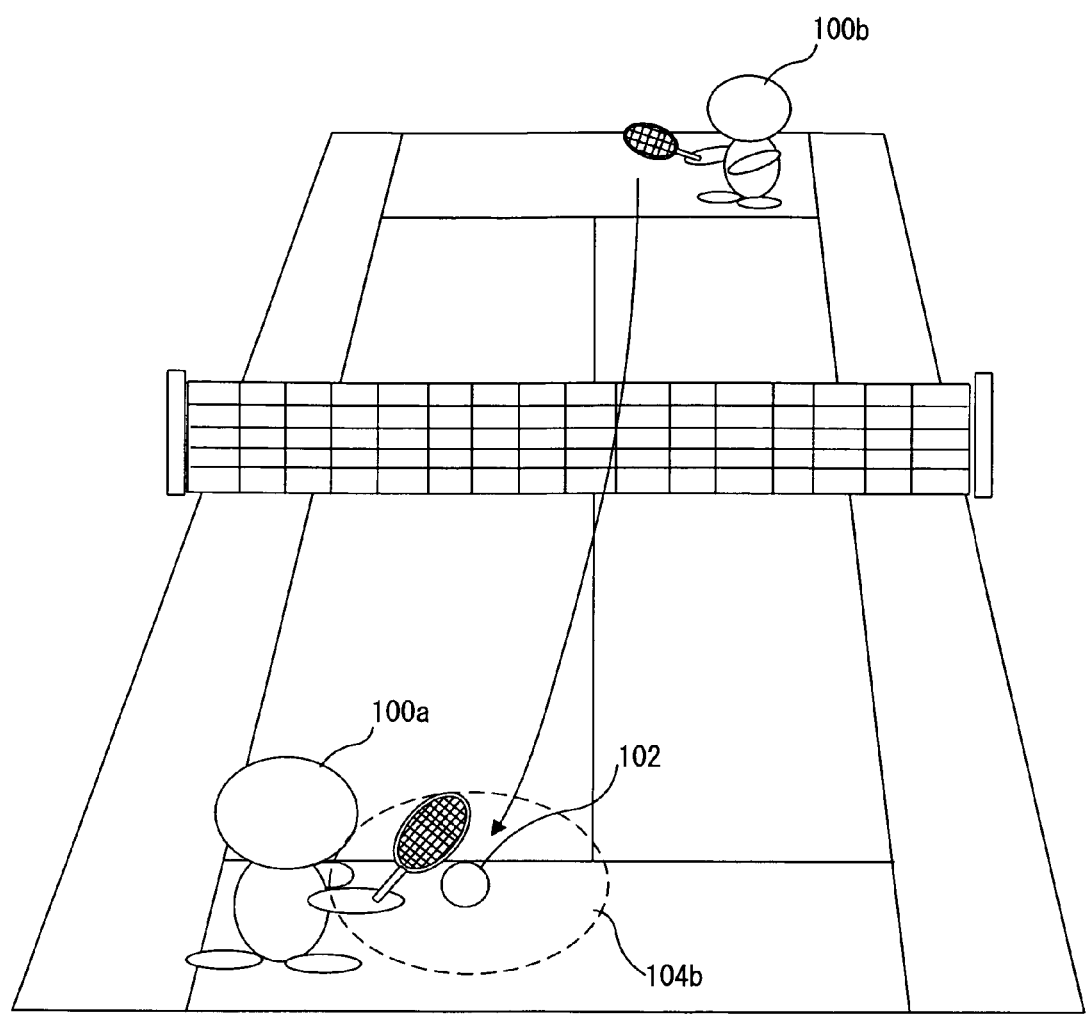
FIG. 5 illustrates SS1, which is one type of offensive special shot.
Figure 6A:
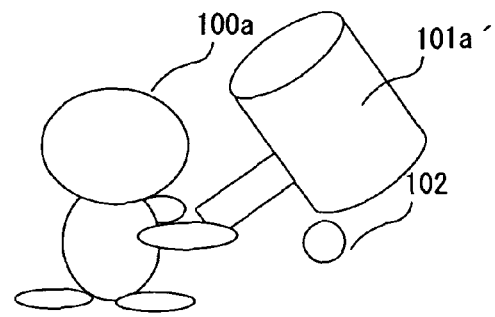
FIG. 6A, FIG. 6B, FIG. 6C and FIG. 6D illustrate SS1, which is one type of offensive special shot.
Figure 6B:
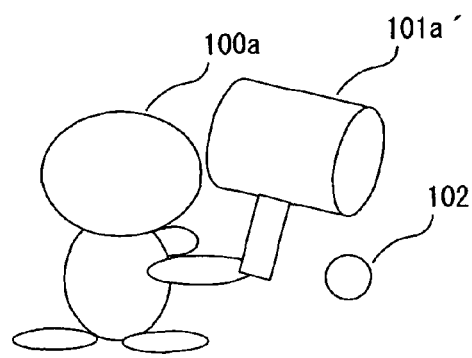
Figure 6C:
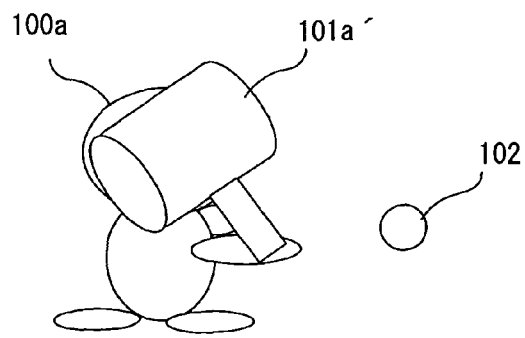
Figure 6D:
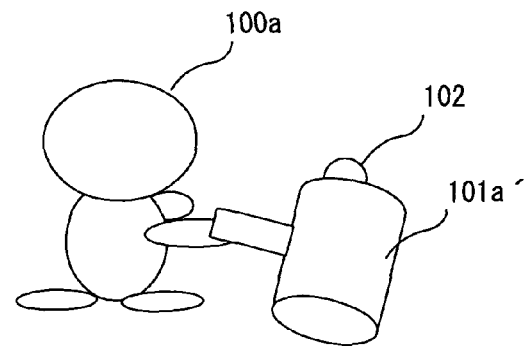
Figure 7:
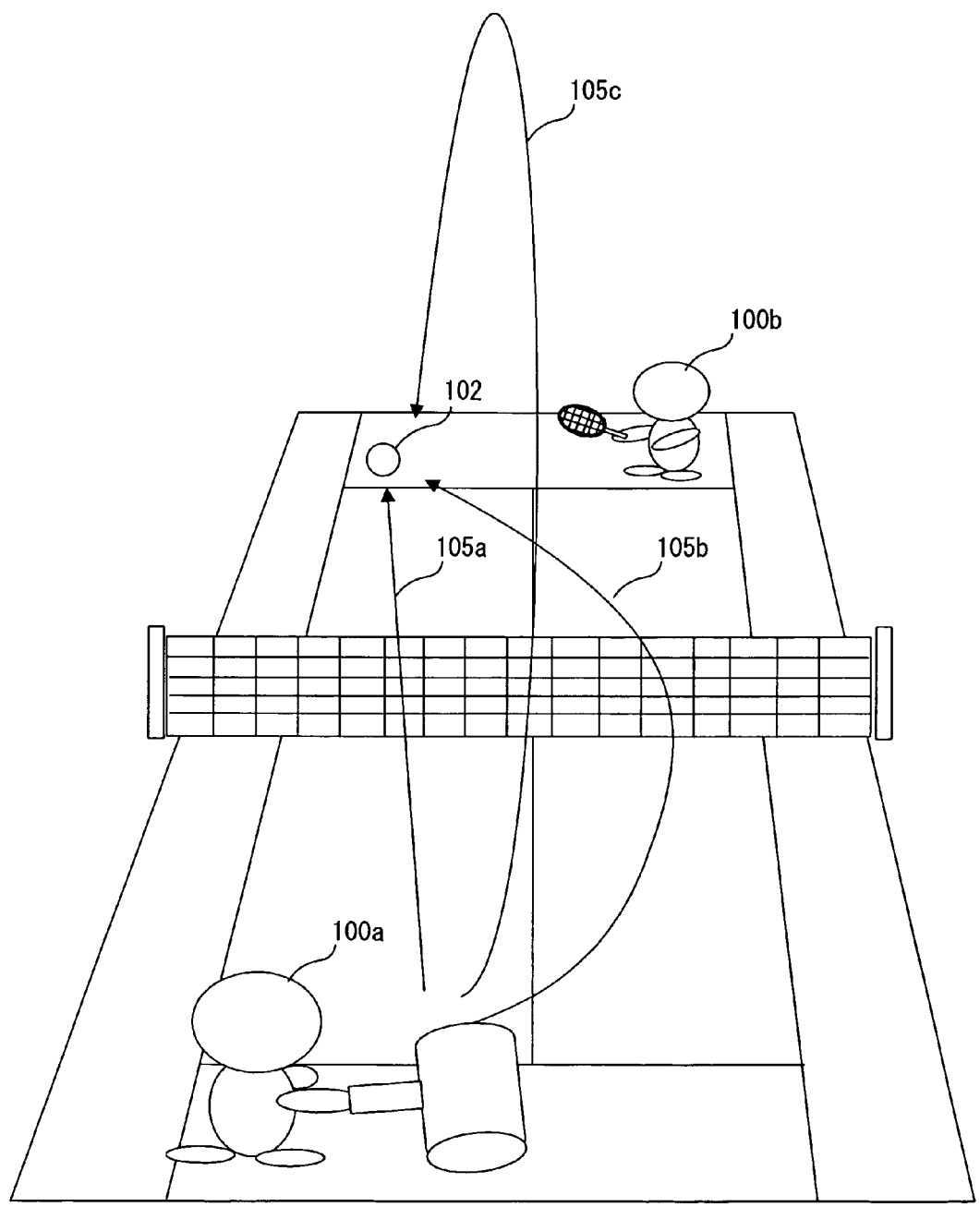
FIG. 7 illustrates SS1, which is one type of offensive special shot.

FIG. 5 through FIG. 7 illustrate one of offensive special shots, SS1, which is assigned to the character 100a. With reference to FIG. 5, a judgment area 104b is set in the virtual space based on the position of the character 100a. When the player operates the A button 20b while operating the R button 20c in this state, the character 100a starts a special shot motion for SS1 (SS1 motion) at the time when the ball 102 hit by a shot motion of the character 100b comes in the judgment area 104b.

For a special shot, substantially the same input processing as that of the usual shot is executed. Namely, the player operating the character 100a may operate the A button 20a at the time when the ball 102 comes in the judgment area 104b (while operating the R button 20c). (The expression "while operating the R button 20c" will be omitted in the following description.) In the case where the ball 102 is already in the judgment area 104b at the time when the A button 20b is operated, the special shot is made immediately after the A button 20a is operated. The player may operate the A button 20b any time after the character 102b hits the ball, even before the ball 102 comes in the judgment area 104b. In this case, the character 100a does not make a special shot at the time when the A button 20b is hit, but makes a special shot later when the ball 102 comes within the judgment area 104b even without the player operating the A button 20b anymore. The above-described input processing is substantially the same for all the types of special shots. The timing of operating the R button 20c does not influence the input of the shot, and the shot is input when the A button 20a is operated. For this reason, in the following descriptions of the special shots, "operating the A button 20b while operating the R button 20c" may be merely expressed as "operating the A button 20b", and "operating the B button 20e while operating the R button 20c" may be merely expressed as "operating the B button 20e".

The judgment area 104b encompasses an area which is not encompassed in the judgment area 104a for the usual shot. The judgment area is different depending on the type of special shot. This will be described later.

As described above, when the A button 20b (or the B button 20e) is operated and the ball 102 is present in the judgment area 104b, the character 100a performs a special shot motion. While the character 100a is performing the special shot motion, the motions of the other objects, i.e., the character 100b, the ball 102 and the other objects not shown (spectator objects, judge objects, other non-living objects, etc.) are at a stop. While the special shot motion is being performed, the usual motion of the ball 102 is at a stop, but the ball 102 may perform a motion unique to the special shot depending on the type of special shot. Specifically, while a special shot SS1, SS2, SS3 or SS5 (described later) is being performed, the ball 102 is at a stop. While a special shot SS4 is being performed, the usual motion of the ball 102 (the motion based on the moving parameters given by the shot motion of the character 100) is at a stop, but the ball 102 performs a motion unique to SS4 (the motion of approaching the character 100a). This will be described later with reference to FIG. 15. The character 100b and the other objects, which have stopped motions thereof, resume motions after the special shot motion is finished using the motion parameters before the stop (moving parameters, motion parameters, etc.).

FIG. 6A through FIG. 6D illustrate a series of sub motions included in the SS1 motion performed by the character 100a for making SS1. For SS1, the character 100a first performs a sub motion of replacing the racket 101a with a hammer 101a' (FIG. 6A), and then performs a sub motion of swinging up and then down the hammer 101a' in a large arc (FIG. 6B and FIG. 6C). Then, as shown in FIG. 6D, the character 100a performs a sub motion of hitting the ball 102 with the hammer 101a'. During this series of sub motions, the motions of the character 100b, the ball 102 and the other objects are at a stop. Therefore, there is no time limit for the series of sub motions, performed by the character 100a, of replacing the racket 101a with the hammer 101a' and swinging up and down the hammer 101a' in a large arc. For this reason, the game creator can freely set dramatic sub motions which entertain the player. Commonly for all the types of special shots, while one character is performing a special shot motion, the motions of the other character, the ball and the other objects are at a stop. In other exemplary embodiments, it may be set such that even while one character is performing a special shot motion, the motions of the objects other than the ball 102 are not at a stop.

In the usual state as shown in FIG. 5, the virtual camera is set to a bird's-eye viewpoint (viewpoint from the sky) or a rear viewpoint (viewpoint from behind the character) such that both the characters 100a and 100b are in the image. However, the virtual camera is set to zoom up the character 100a such that the character 100a can be displayed large at the time when the character 100a starts the special shot motion. Specifically, the virtual camera is set such that the viewing direction is toward the character 100a and the zooming ratio is over 100%. When the state shown in FIG. 6C is realized, the virtual camera is returned to the setting of the bird's-eye viewpoint or the rear viewpoint as in the usual state. By this, a part of the special shot motion of the character is zoomed up to entertain the player, whereas the play after the special shot is not hindered because at the instance that the character 100a hits the ball 102 with the racket, the virtual camera has been returned to the setting of the bird's-eye viewpoint or the rear viewpoint and thus both the characters 100a and 100b are in the image.

FIG. 7 illustrates the motion of the ball 102 after the SS1 motion is performed. The ball 102 hit by the SS1 motion moves to the opponent's court at a high speed as represented by reference numeral 105a. Another type of offensive special shot, SS2, is realized by setting the same judgment area 104b as that of SS1 and causing the character 100a to perform a special shot motion with a bat (not shown) instead of the hammer 101a' as in FIG. 6A through FIG. 6D. The motion of the ball 102 hit by a motion for SS2 (SS2 motion) may move to the opponent's court while curving in a large arc as represented by reference numeral 105b in FIG. 7, or may fly high and then rapidly drop on the opponent's court as represented by reference numeral 105c in FIG. 7.

Figure 8:
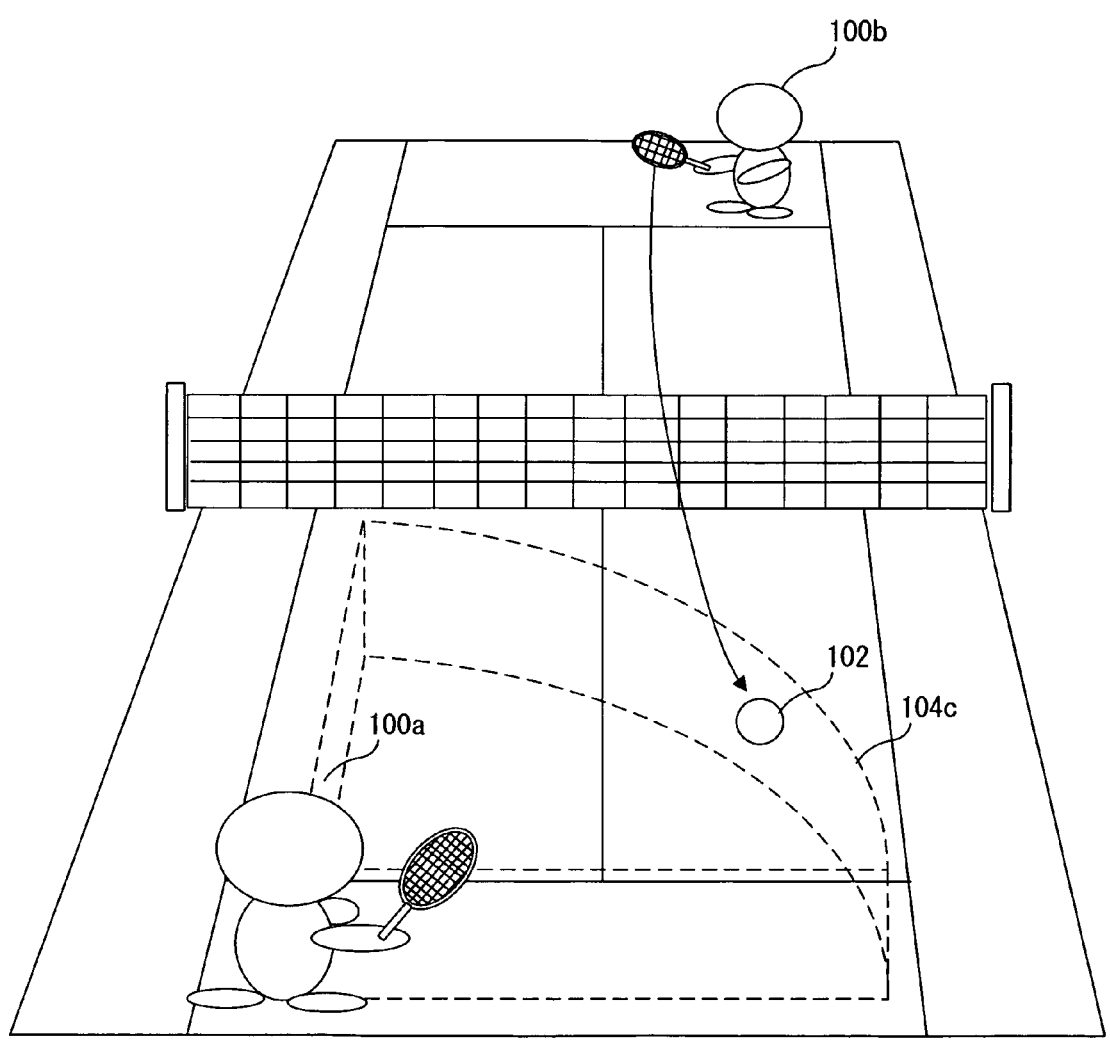
FIG. 8 illustrates SS3, which is one type of defensive special shot.

FIG. 8 and FIG. 9A through FIG. 9D illustrate one type of defensive special shots, SS3. With reference to FIG. 8, in the case where SS3 is assigned to the character 100a, a judgment area 104c is set in the virtual space based on the position of the character 100a. When the player operates the B button 20e while operating the R button 20c in this state, the character 100a starts a motion for SS3 (SS3 motion) when the ball 102 hit by a shot motion of the character 100b is present in the judgment area 104c.

Figure 9A:
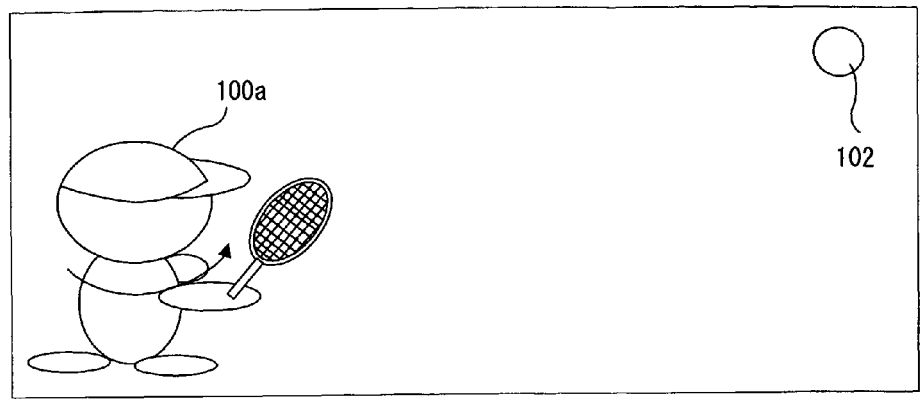
FIG. 9A, FIG. 9B, FIG. 9C and FIG. 9D illustrate SS3, which is one type of defensive special shot.
Figure 9B:
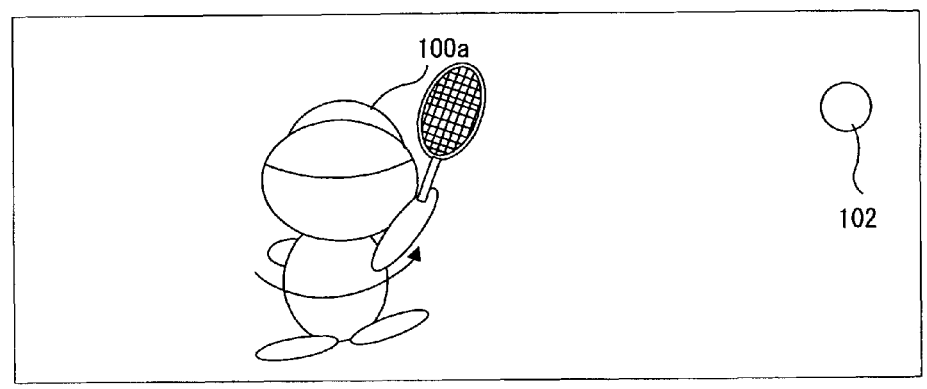
Figure 9C:
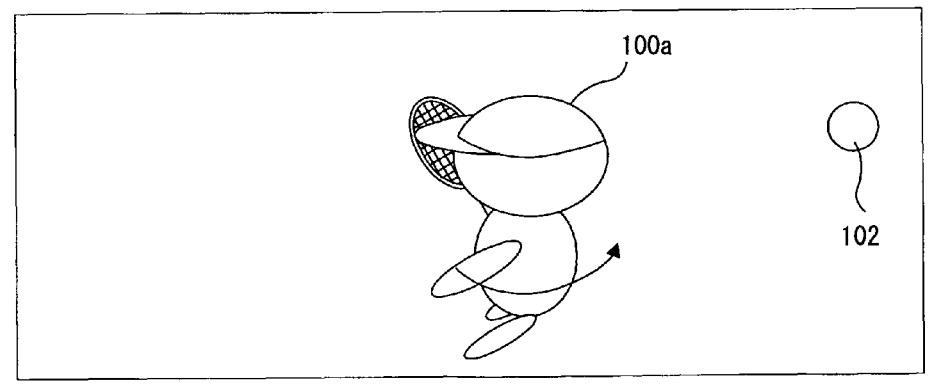
Figure 9D:
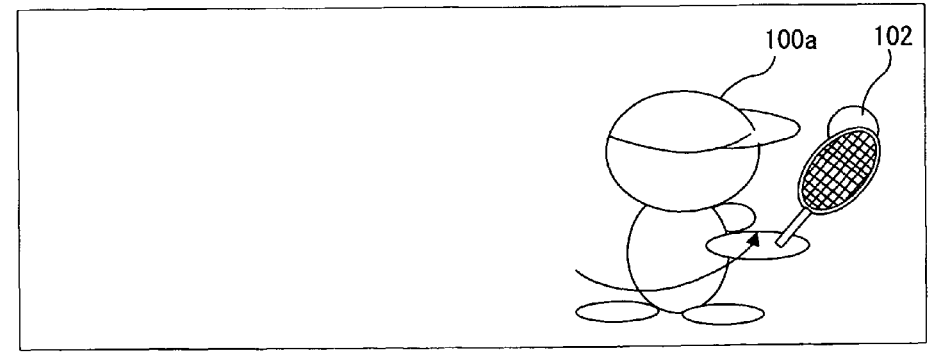

In FIG. 8, the character 100a is currently in a left part of the court, and the ball 102 hit by the opponent character 100b is moving in a course escaping to a right part of the court. Therefore, the character 100a usually could not catch up with the ball 102 and lose a point. However, the loss of a point can be avoided by causing the character 100a to make the defensive special shot SS3. Specifically, by the player operating the B button 20e while operating the R button 20c, the character 100a performs a series of sub motions for the SS3 motion as shown in FIG. 9A through FIG. 9D while the ball 102 is present in the judgment area 104c. First, the character 100a performs a sub motion of spinning on the spot (FIG. 9A). Then, the character 100a gradually moves toward the ball 102 while still spinning (FIG. 9B and FIG. 9C). When approaching the ball 102 close enough to hit the ball 102, the character 100a performs a sub motion of hitting the ball 102 while spinning (FIG. 9D). In FIG. 9A through FIG. 9D, the character 100a is shown as wearing a cap for better showing that the character 100a is spinning.

As described above, for SS3, the character 100a approaches the ball 102 close enough to hit the ball 102 and performs a sub motion of hitting back the ball 102. In the case where the character 100a and the ball 102 are close to each other at the time when it is determined that the special shot motion should be started, the character 100a can approach the ball 102 close enough to hit the ball 102 in a short time. In this case, the duration of the special shot motion (especially, the duration of the sub motions of the character 100a moving while spinning and then hitting the ball 102) is too short, and thus the player can watch the special shot motion only in a short time. This cannot entertain the player. Therefore, in the case where the distance between the character 100a and the ball 102 is equal to or shorter than a predetermined distance when it is determined that the special shot motion should be started, the position of the character 100a and/or the ball 102 may be made farther from the other. By such setting, the distance between the character 100a and/or the ball 102 can be made longer and thus the duration of the special shot motion can be made longer.

Figure 10A:
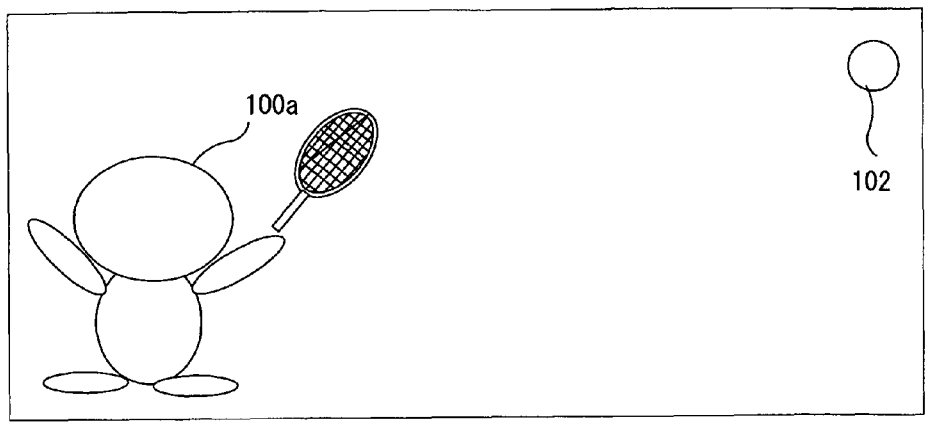
FIG. 10A, FIG. 10B, FIG. 10C and FIG. 10D illustrate SS4, which is one type of defensive special shot.
Figure 10B:
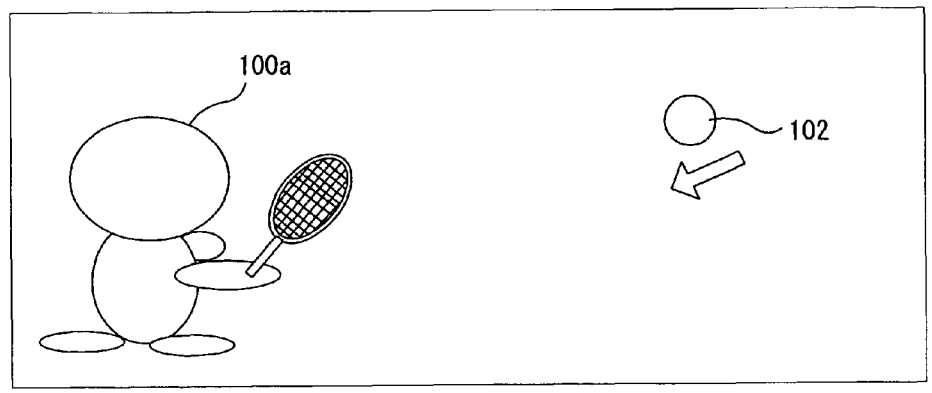
Figure 10C:
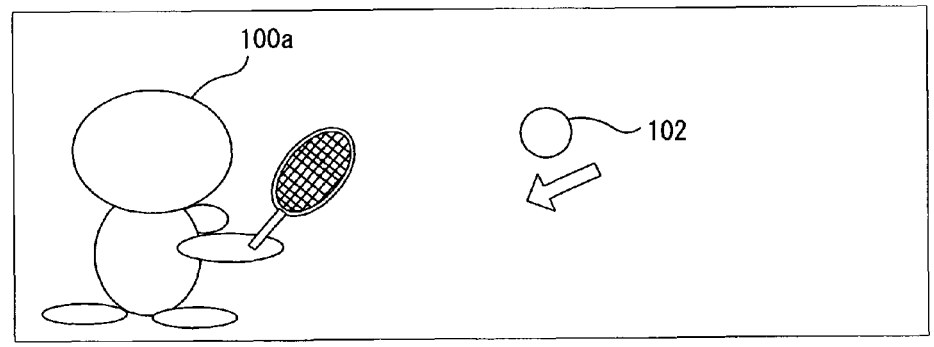
Figure 10D:
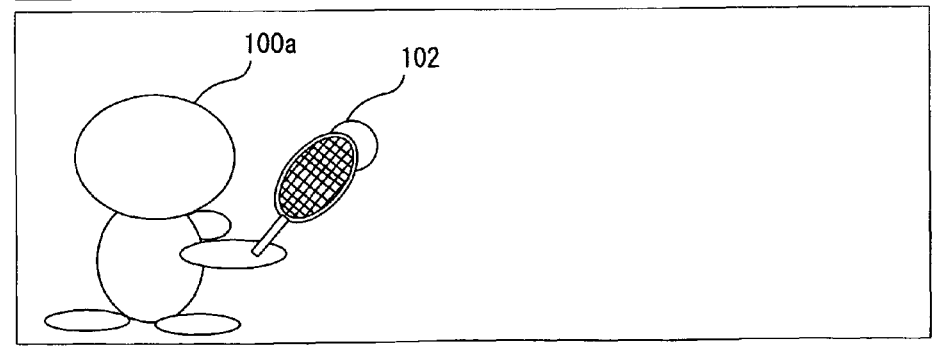

Another type of defensive special shot, SS4, is realized by setting the same judgment area 104c as that of SS3 and causing the character 100a to perform a series of sub motions for a motion for SS4 (SS4 motion) as shown in FIG. 10A through FIG. 10D. Specifically, when the B button 20e is operated while the R button 20c is operated and the ball 102 is present in the judgment area 104c, as shown in FIG. 10A, the character 100a performs a sub motion of assuming a signature pose. While the character 100a is performing the sub motion of assuming the signature pose shown in FIG. 10A, the motion of the ball 102 is at a stop. After the sub motion of the character 100a of assuming the signature pose is finished, as shown in FIG. 10B and FIG. 10C, the ball 102 is performing a sub motion of approaching the character 100a. When the ball 102 approaches the character 100a close enough for the character 100a to hit the ball 102, the character 100a performs a sub motion of hitting the ball 102 (FIG. 10D).

Figure 11:
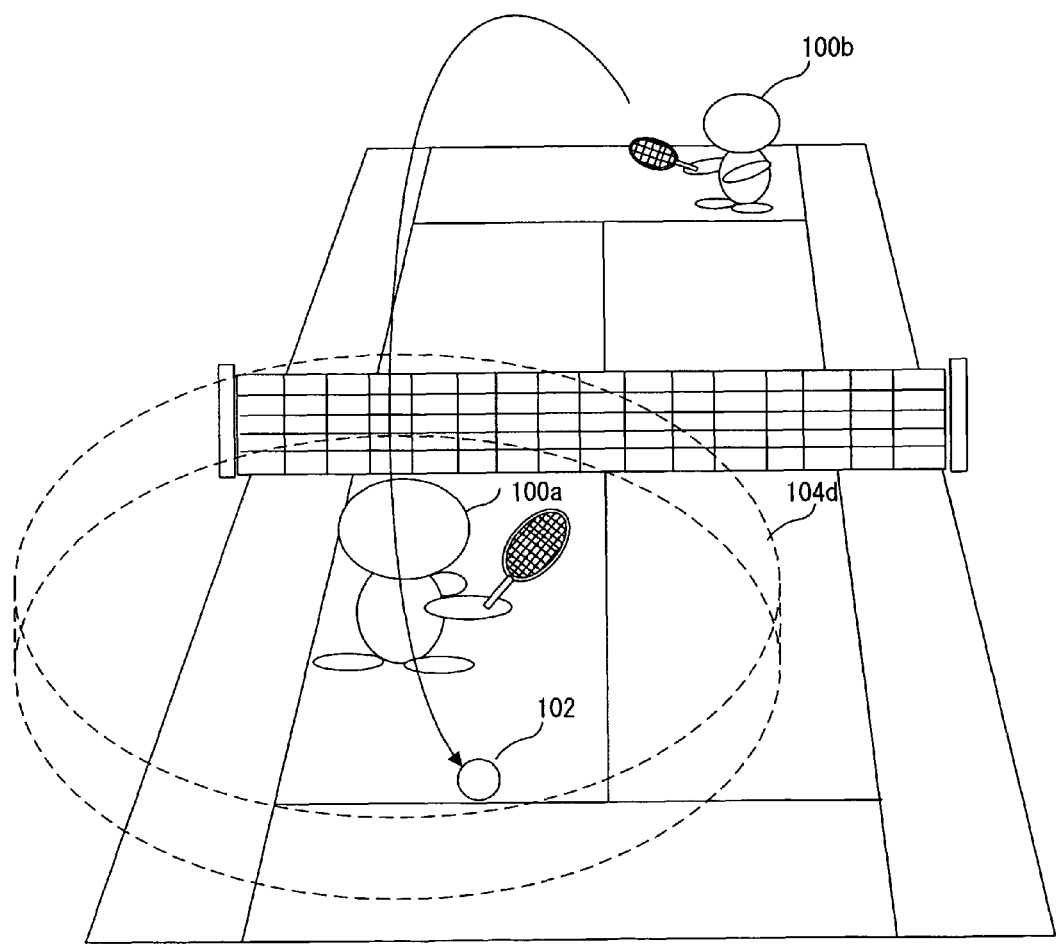
FIG. 11 illustrates SS5, which is one type of defensive special shot.

FIG. 11 illustrates still another type of defensive special shot, SS5. With reference to FIG. 11, when SS5 is assigned to the character 100a, a judgment area 104d is set in the virtual space based on the position of the character 100a. When the player operates the B button 20e while operating the R button 10c in this state, the character 100a starts a motion for SS5 (SS5 motion) when the ball 102 hit by a shot motion of the character 100b is present in the judgment area 104d.

Figure 12A:
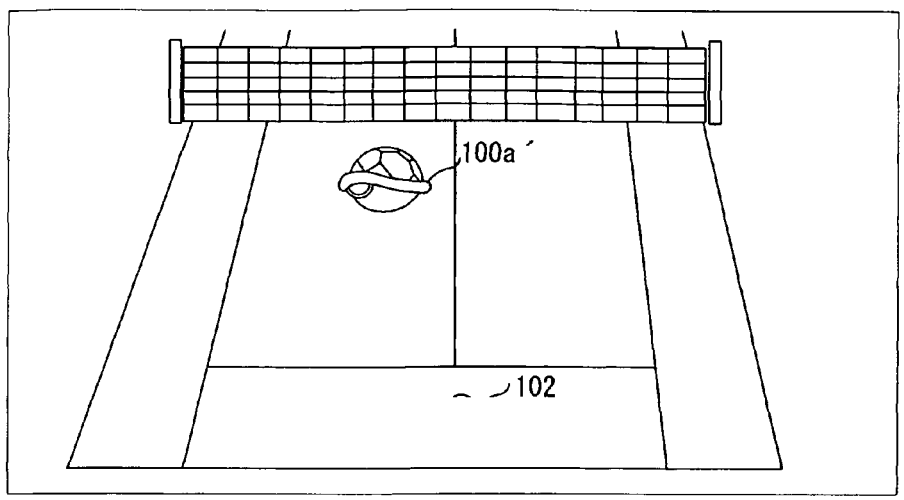
FIG. 12A, FIG. 12B and FIG. 12C illustrate SS5, which is one type of defensive special shot.
Figure 12B:
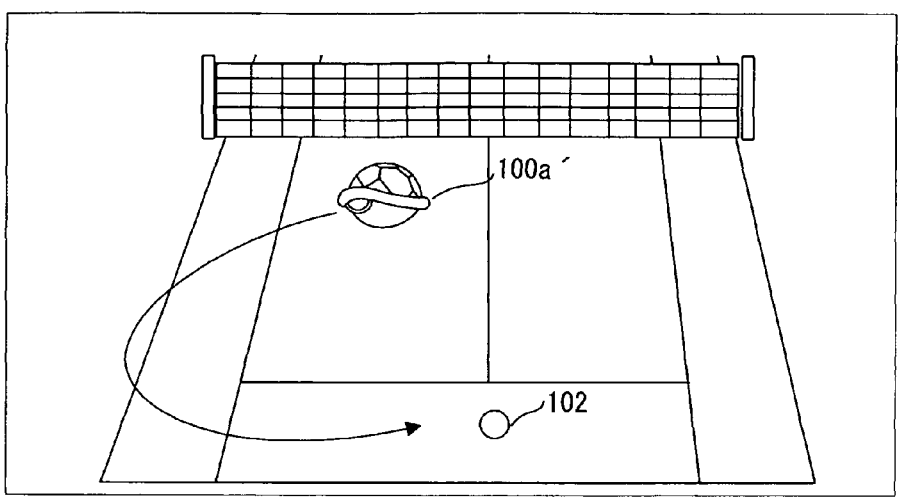
Figure 12C:
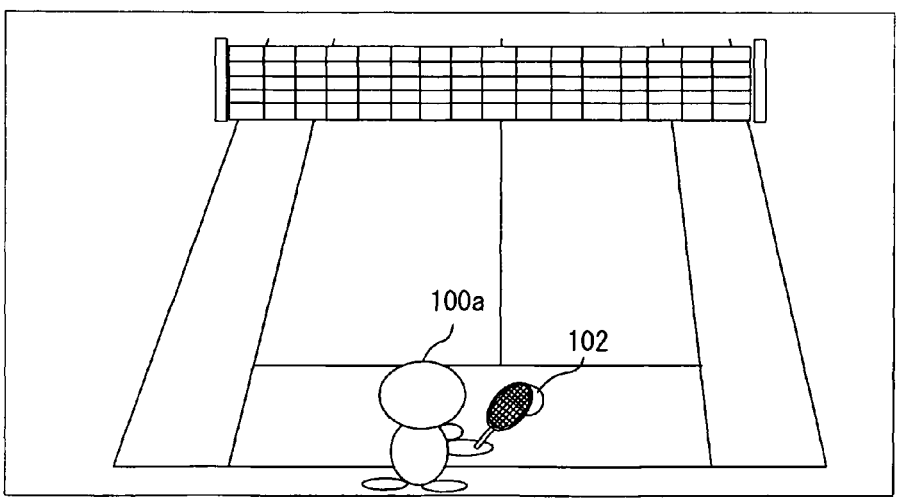

In FIG. 11, the character 100a is currently close to the net of the court, and the ball 102 hit by the opponent character 100b is moving in a course of going over the character 100a as a lobbing ball and dropping behind the character 100a. Therefore, the character 100a usually could not catch up with the ball 102 and lose a point. However, the loss of a point can be avoided by causing the character 100a to make the defensive special shot SS5. Specifically, by the player operating the B button 20e while operating the R button 20c, the character 100a performs a series of sub motions for the SS5 motion as shown in FIG. 12A through FIG. 12D while the ball 102 is present in the judgment area 104d. First, the character 100a is transformed into a turtle 100a' on the spot (FIG. 12A). Then, the turtle 100a' gradually moves toward the ball 102 in a largely bypassing course (FIG. 12B). When approaching the ball 102 close enough to hit the ball 102, the turtle 100' is returned to the usual form of the character 100 and performs a sub motion of hitting the ball 102 (FIG. 12C). For SS5, in order to avoid the duration of the special shot motion (especially, the sub motions of the character 100a of being transformed into a turtle, approaching the ball 102, and then hitting the ball 102) from being too short, the course of the character 100a for approaching the ball 102 is determined based on the distance between the character 100a and the ball 102 when it is determined that the special shot motion should be started.

Specifically, when the distance is short, the character 100a approaches the ball 102 in an arc of a large radius; and when the distance is long, the character 100a approaches the ball 102 in an arc of a small radius. In the case where the distance is long, the character 100a may be set to approach the ball 102 in a straight line.

As described above, for the defensive special shots SS3 and SS5, while the motion of the ball 102 is at a stop, the character 100a approaches the ball 102. Thus, the character 100a and the ball 102 are adjusted to be in a positional relationship which allows the character 100a to hit the ball 102. Then, the character 100a hits the ball 102. For SS4, while the motion of the ball 102 is at a stop, the character 100a assumes a signature pose and then the ball 102 is forcibly moved toward the character 100a while the usual motion of the ball 102 is at a stop. Thus, the character 100a and the ball 102 are adjusted to be in a positional relationship which allows the character 100a to hit the ball 102. Then, the character 100a hits the ball 102. By such setting, the character 100a can hit the ball 102 which usually could not be caught up with. Therefore, an extremely unexpected tennis game can be provided while keeping the continuity of the game. The character 100a and the ball 102 may be moved so as to approach each other.

In other exemplary embodiments, instead of moving the entirety of the character 100, a part thereof, i.e., the racket 101 may be moved. Namely, the racket 101 may be moved to a position at which the racket 101 contacts the ball 102 in a special shot motion. In this case, in response to the racket 101 contacting the ball 102, the ball 102 is hit back as in the other shot motions. Before the racket 101 is moved, the character 100 may perform a sub motion of throwing the racket 101.

In order to make a special shot, it is necessary to accumulate power (hereinafter, referred to as "SS power"). The character 100 can be moved on the tennis court by an operation of the joystick 20a. When the character 100 moves, SS power is accumulated in accordance with the amount of movement. A special shot cannot be made unless the level of the SS power is maximum. Namely, even if the A button 20b or the B button 20e is operated, the character 100 does not perform a special shot motion unless the level of the SS power is maximum. After the character 100 performs a special shot motion, the level of the SS power becomes zero. This prevents a special shot from being made frequently, and thus the balance of the game is prevented from being destroyed. The level of the SS power may be increased or decreased by other factors. After a special shot motion is performed, the level of the SS power may be decreased in accordance with a predetermined rule instead of being made zero.

Figure 13A:
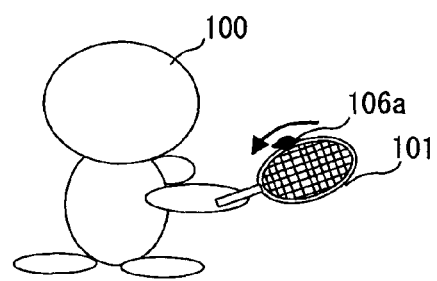
FIG. 13A, FIG. 13B, FIG. 13C, FIG. 13D and FIG. 13E show a method for indicating an accumulated amount of SS power.
Figure 13B:
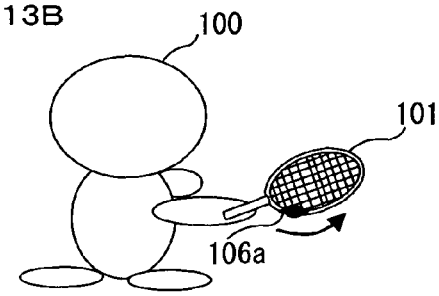
Figure 13C:
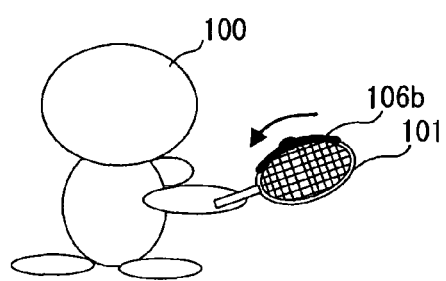
Figure 13D:
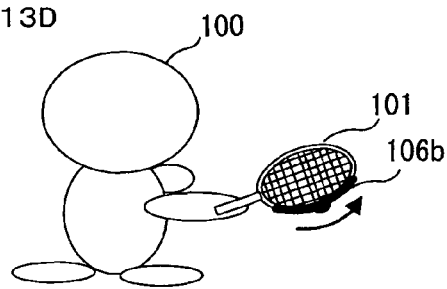
Figure 13E:
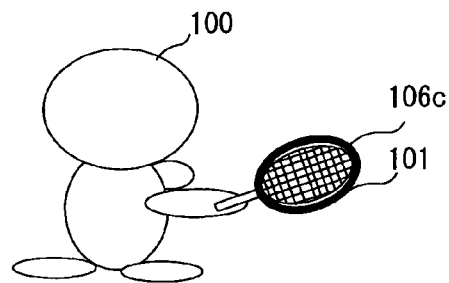

FIG. 13A through FIG. 13E show a method for indicating an accumulated amount of the SS power to the player. Specifically, the racket 101 is provided with a light emitting object 106 on an edge thereof, although not shown in FIG. 3 through FIG. 12C. When the level of the SS power is zero, the light emitting object 106 is point-shaped as represented by reference numeral 106a. The point shaped object 106 goes along the edge of the racket 101 (the change between FIG. 13A and FIG. 13B is repeated). When the SS power is accumulated, the light emitting object 106 extends along the edge of the racket as represented by reference numeral 106b. In this state also, the light emitting object 106 goes along the edge of the racket 101 (FIG. 13C and FIG. 13D). As the accumulated amount of the SS power increases, the length of the light emitting object 106 along the edge of the racket 106 increases. When the level of the SS power becomes maximum, the light emitting object 106 extends around the entirety of the edge of the racket 106 (FIG. 13E). The player can learn the amount of the SS power currently accumulated by the shape of the light emitting object 106.

One light emitting object 106 is provided for each racket 101 (i.e., for each character 100), and is shaped in accordance with the value of the SS power of the corresponding character 100. Namely, during the tennis game, the value of the SS power of each character 100 is calculated, and each character 100 can make a special shot as signed thereto when the value of its SS power fulfills a predetermined condition. The racket image of each character 100 is changed in accordance with the value of its SS power.

A gauge indicating the level of the SS power may be represented by a bar-like image which extends in accordance with the accumulated amount, provided separately from the image representing the virtual space. Instead, in the tennis game in this exemplary embodiment, a light emitting object is provided in the virtual space, and the amount of the SS power currently accumulated is indicated to the player by changing the shape of the light emitting object. This eliminates the necessity of an area for displaying a bar-like image and thus enlarges the area for displaying the image of the virtual space, and also prevents the image of the virtual space from being obstructed by the overlapping image of the bar-like image. The light emitting object, which is located on the edge of the racket of each character, provides an advantage that the correspondence between the accumulated amount of the SS power and the character is easy to grasp.

In this exemplary embodiment, the light emitting object 106 is located on the edge of the racket 101. According to an alternative design, the image (texture) of the racket 101 may be changed such that the edge of the racket emits light and the shape of the light emitting area is enlarged or reduced.

Next, with reference to FIG. 14 through FIG. 24, various tables necessary for executing the game processing in this exemplary embodiment will be described. These tables are stored on the optical disc 16, and is transferred to, and stored on, the main memory 34 for executing the game program. It is not necessary that the table data is actually stored in the form of table data; it is only necessary that processing corresponding to these tables is described in the game program.

FIG. 14 shows a character table. In the tennis game in this exemplary embodiment, a plurality of unique characters are prepared, and the player selects one character to operate before starting the game. The character table sets the character name, and ability values (running speed, speed of the ball, level of spinning skill, stamina, etc.) for each of the characters prepared. The character table also defines offensive special shot names and defensive special shot names (practically, numbers for identifying the special shots) as signed to each character. As shown in FIG. 14, character 1 is assigned the offensive special shot SS1 and the defensive special shot SS3, and character 2 is assigned the offensive special shot SS2 and the defensive special shot SS4 (characters 3 et seq. are assigned an offensive and a defensive special shots in the same manner). The player who selected character 1 can cause character 1 to perform an SS1 motion when operating the A button 20b while operating the R button 20c, and can cause character 1 to perform an SS3 motion when operating the B button 20e while operating the R button 20c.

FIG. 15 show a special shot table (hereinafter, referred to as an "SS table"). The SS table shows a judgment area for each type of special shot, and motion details performed by each character and ball for performing a special shot motion.

As the judgment area, a special shot area (SS area) which is used as a condition for starting a special shot motion is set. For example, a condition for starting an SS1 motion is that the ball 102 is present in the judgment area which is set in the virtual space based on an SS area A. Needless to say, the A button 20b needs to be operated for starting the SS1 motion as described above. (For defensive special shots, the B button 20e needs to be operated.) More specifically, it is determined that the SS1 motion should be started in the case where, after the opponent character 100 hits the ball 102, the A button 20b is operated while the R button 20c is operated, and the ball 102 is present in the judgment area which is set based on the SS area A at the time of, or after, the operation of the A button 20b. A method for setting the SS area A and a judgment area based on the SS area A will be described later.

It is determined that an SS2 motion should be started using the judgment area based on the SS area A in substantially the same manner. It is determined that an SS3 motion should be started using a judgment area based on an SS area B. For each of SS4 and other special shot motions also, one area is defined in the same manner. For an SS7 motion, "all the areas" is defined. Namely, a series of sub motions for an SS7 motion are started at the time when the A button 20b is operated while the R button 20c is operated, regardless of the position of the ball 102 in the character's own court. However, the series of sub motions are not started in the case where the ball 102 is in the opponent's court as described later.

In FIG. 15, as the motion details, the series of sub motions performed in the virtual space by the character that has been determined to make a special shot are defined. For example, for SS1, the character performs the sub motions of holding a hammer and swinging the hammer up and down in a large arc (FIG. 6A through FIG. 6C), and then performs the sub motion of hitting the ball (FIG. 6D). For SS3, the character performs the sub motions of spinning on the spot (FIG. 9A) and moving toward the ball while spinning (FIG. 9B and FIG. 9C), and then performs the sub motion of hitting the ball (FIG. 9D).

The motion details of the ball for a special shot which are defined in FIG. 15 are the motion details of the ball 102 in the virtual space while the special shot motion is being performed by the character 100. The motion motions of the ball 102 are irrelevant to the moving parameters given to the ball 102 by the shot of the character 100. Namely, while the special shot motion is being performed, the ball 102 moves ignoring the moving parameters given to the ball 102 by the shot of the character 100. The moving parameters of the ball 102 may include, for example, parameters indicating the initial speed, the initial direction and the spin of the ball. For example, for SS1, it is defined that the ball 102 is at a stop while the special shot motion is being performed. For SS4, it is defined that the ball 102 is at a stop in an initial period of the special shot motion, and after the motion of the character 100 of assuming a pose is finished, the ball 102 moves toward the position of the character 100. When the ball 102 is defined to be at a stop, the ball 102 does not make any specific motion as described later.

FIG. 16 shows an area table. The area table defines the SS areas described above and usual shot area. This table defines relative areas for the virtual space. These areas are set in the virtual space based on the current position of the character 100, and thus the judgment areas 104a through 104d are set. Each area will be specifically described with reference to FIG. 18 through FIG. 21 later.

Before describing each area, a game space coordinate system will be defined with reference to FIG. 17. The game space coordinate system has an X axis in the direction of the base line of the tennis court 103 (positive in the rightward direction), a Z axis in the direction of the side line (positive in the depth direction), and a Y axis in the height direction of the virtual space (positive in the upward direction).

Figure 18:
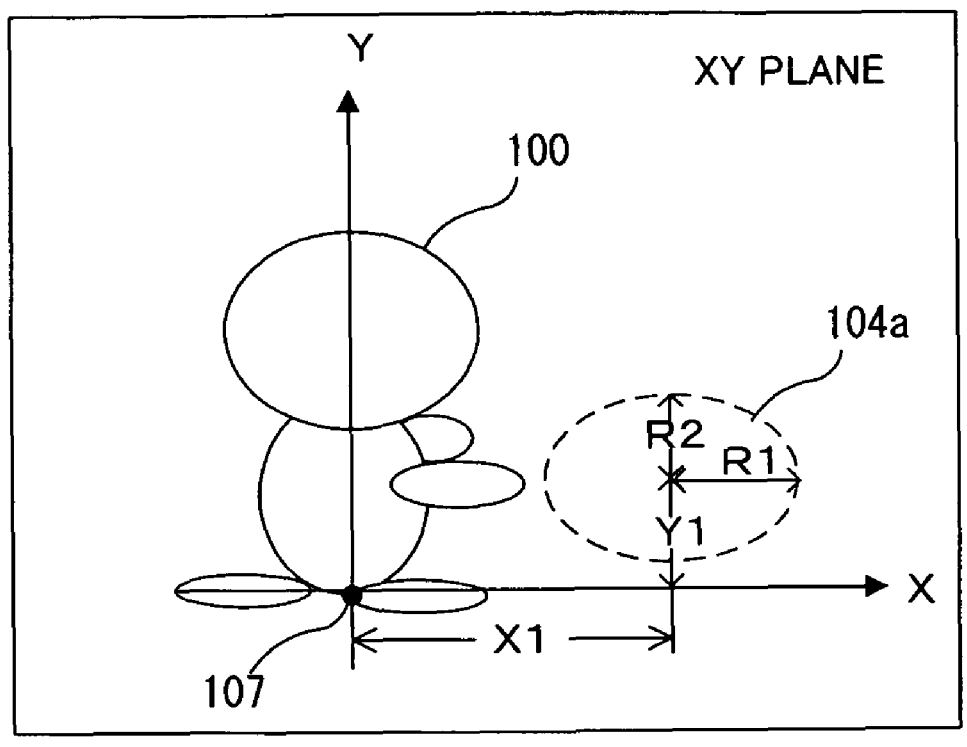
FIG. 18 illustrates a usual shot area.

The usual shot area is defined as shown in FIG. 18. The usual shot area is set on an X-Y plane (the value along the Z axis is fixed) including a position 107 of the character 100 in the virtual space. The usual shot area is an elliptical area having its center at the position which is away from the position 107 by X1 in the X direction (in the positive direction when the character 100 holds the racket 101 on its right, and the in the negative direction when the character 100 holds the racket 101 on its left) and by Y1 in the Y direction (positive direction), with a longer radius of R1 and a shorter radius of R2. The usual shot area thus set is used as the judgment area 104a in FIG. 4, and is used for determining whether a usual shot should be started or not as described above.

Figure 19:
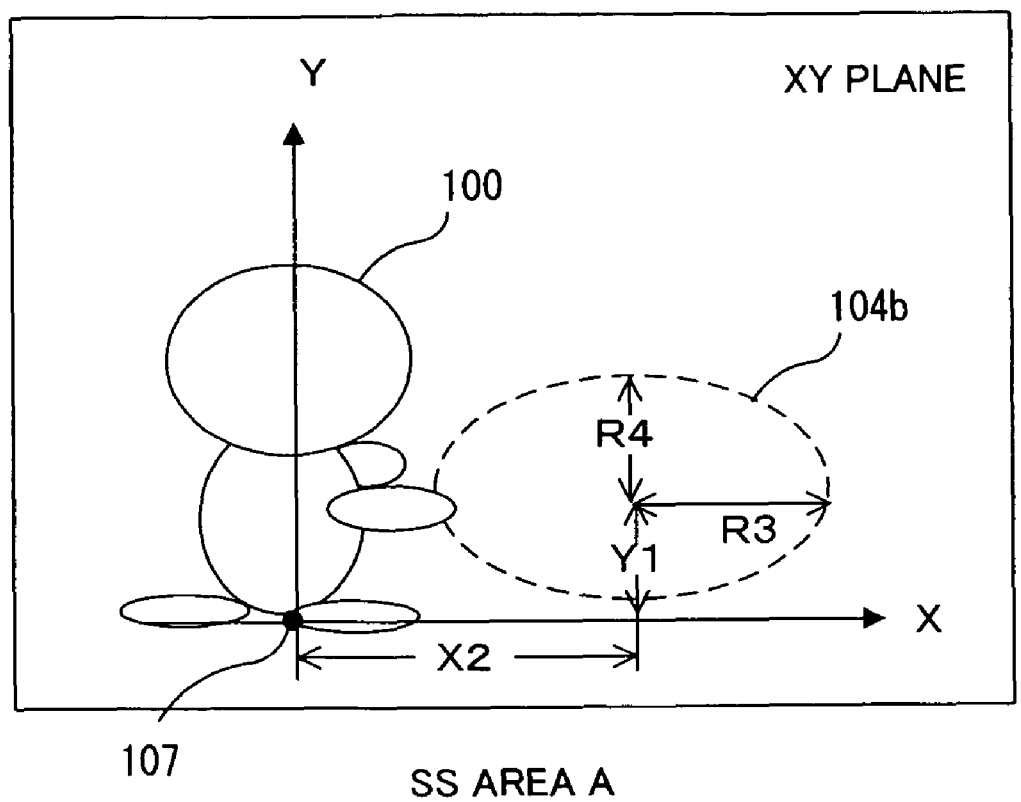
FIG. 19 illustrates an SS area A.

The SS area A is defined as shown in FIG. 19. The SS area A is set on the X-Y plane (the value along the Z axis is fixed)

including the position 107 of the character 100 in the virtual space. The usual shot area is an elliptical area having its center at the position which is away from the position 107 by X2 in the X direction (in the positive direction when the character 100 holds the racket 101 on its right, and the in the negative direction when the character 100 holds the racket 101 on its left) and by Y1 in the Y direction (positive direction), with a longer radius of R3 and a shorter radius of R4. Since R3 is greater than R1 and R4 is greater than R2, the SS area A encompasses an area which is not encompassed in the usual shot area. As described above, an SS area is set to have a larger area size or larger volume than the usual shot area. Even if an SS area does not have a larger area size or larger volume than the usual shot area, the SS area at least encompasses an area which is not encompassed in the usual shot area. In addition, an SS area is set so as to encompass a point which is away from the character object by a distance longer than the distance between the character object and the point in the usual shot area which is farthest from the character object.

Figure 20:
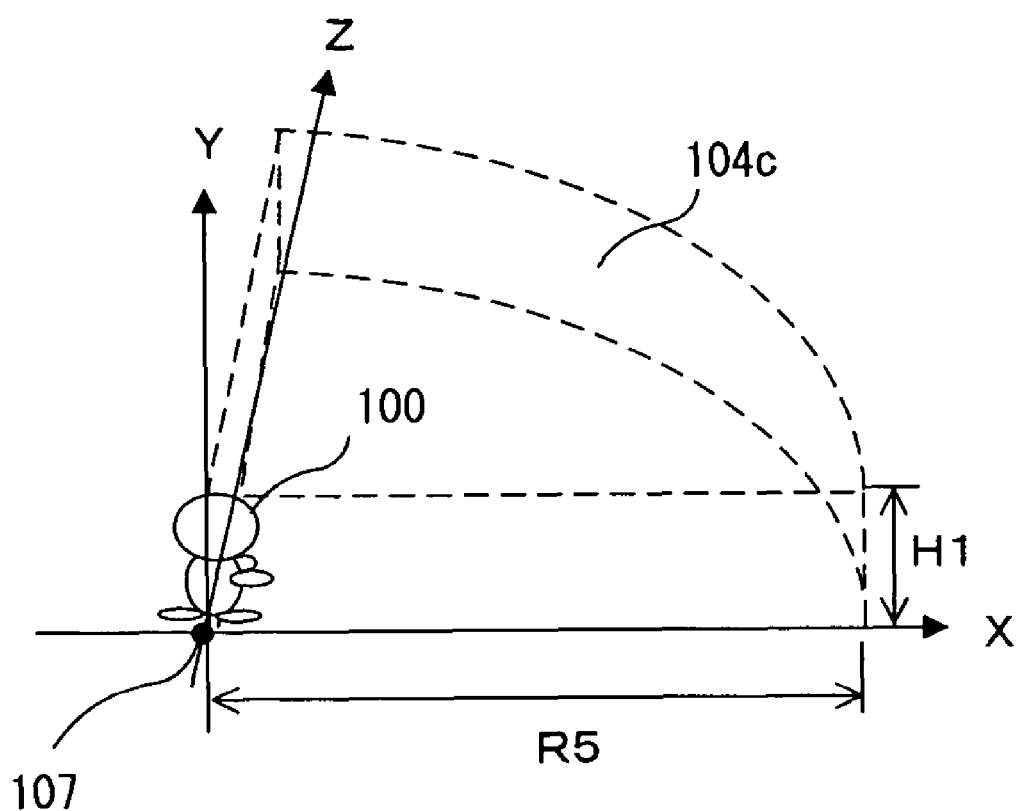
FIG. 20 illustrates an SS area B.

The SS area A thus set is used as the judgment area 104$b$ in FIG. 5, and is used for determining whether the SS1 motion and the SS2 motion should be started or not as described above. In this exemplary embodiment, the usual shot area and the SS area A are planar. Alternatively, the usual shot area and the SS area A may be three-dimensional with the value along the Z axis being varied. The SS area B is defined as shown in FIG. 20. The SS area B is set in a cylinder having its center at the position 107 of the character 100 in the virtual space, with the radius of the bottom surface of R5 and the height of H1 ($0<y<H1$). When the character 100 holds the racket 101 on its right, the SS area B is a ¼ cylinder with $X>0$ and $Z>0$. When the character 100 holds the racket 101 on its left, the SS area B is a ¼ cylinder with $X<0$ and $Z>0$. For the sake of description, the origin of the space coordinate system is set at the position 107. R5 is greater than X1+R1, and thus the SS area B encompasses an area which is not encompassed in the usual shot area. The SS area B thus set is used as the judgment area 104$c$ in FIG. 8, and is used for determining whether the SS3 motion and the SS4 motion should be started or not as described above.

Figure 21:
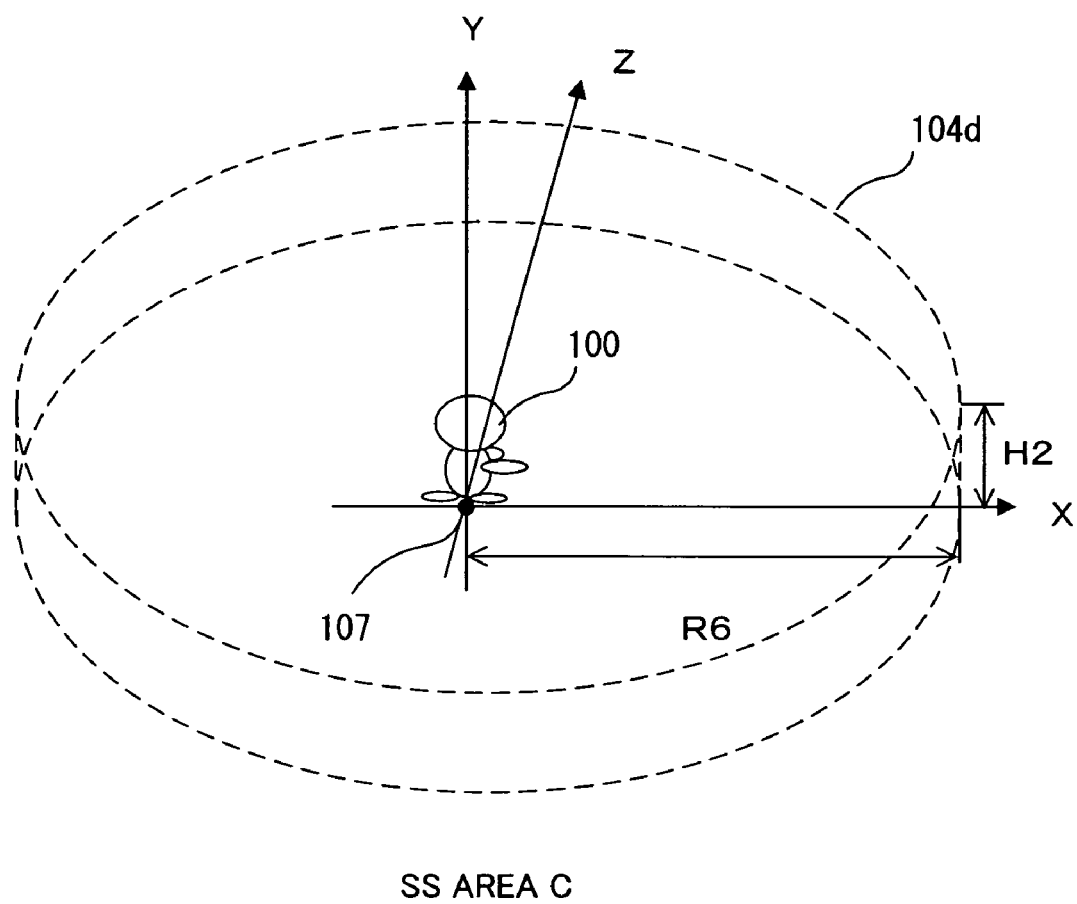
FIG. 21 illustrates an SS area C.

An SS area C is defined as shown in FIG. 21. The SS area C is a cylinder having its center at the position 107 of the character 100 in the virtual space, with the radius of the bottom surface of R6 and the height of H2 ($0<y<H2$). For the sake of description, the origin of the space coordinate system is set at the position 107. R6 is greater than X1+R1, and thus the SS area C encompasses an area which is not encompassed in the usual shot area. The SS area C thus set is used as the judgment area 104$d$ in FIG. 11, and is used for determining whether the SS5 motion should be started or not as described above.

Although not shown, an SS area D is an area having a height of $0 \leqq y \leqq H3$. (The position 107 of the character 100 in the virtual space is irrelevant to the SS area D.)

As described above, in this exemplary embodiment, different judgment areas are set for different type of shots, i.e., the usual shot, the offensive special shots and the defensive special shots. These judgment areas are set to encompass an area which is not encompassed in the other judgment areas. Namely, the usual shot, the offensive special shots and the defensive special shots have an area in which the ball can be hit only by the respective type of shot. In other exemplary embodiments, the entire judgment area of one type of shot may be encompassed in a judgment area of another type of shot.

Although not described above, in an area set in the virtual space based on each of the usual shot area and the SS areas, a partial area located in the opponent's court is excluded from the judgment area. By this setting, a shot motion is prevented from being performed on the ball 102 in the opponent's court.

FIG. 22 shows a virtual camera control table. As described above, the virtual camera is set to a bird's-eye viewpoint or a rear viewpoint in the usual state (in the state where no character 100 is performing a special shot motion). The bird's-eye viewpoint is, specifically, a viewpoint from a camera in the sky above the tennis court, which is set at such a viewing angle that both the character 100$a$ and the character 100$b$ can be viewed with the viewing direction from the camera toward the ground. The rear viewpoint is a viewpoint from a camera behind either one of the character 100$a$ and the character 100$b$, which is set at such a viewing angle that both the character 100$a$ and the character 100$b$ can be viewed with the viewing direction from the camera toward the other character 100$a$ or 100$b$. As described above, in the usual state, the virtual camera is set so as to display an image including both the character 100$a$ and the character 100$b$. When one character starts a special shot motion, the camera control is conducted as follows. The virtual camera is set such that, when a special shot motion is started, the character performing the special shot is zoomed up. In this manner, the special shot motion is emphasized, and the dramatic effect of the special shot motion is enhanced. At a certain timing during the special shot motion (at least before the character 100 hits the ball 102 by a shot motion), the virtual camera is returned to the usual state. Thus, when the ball 102 is hit by the shot motion, the virtual camera has been returned to the state of including both the character 100$a$ and the character 100$b$ in the camera image. Therefore, the play after that is not obstructed.

Figure 23A:
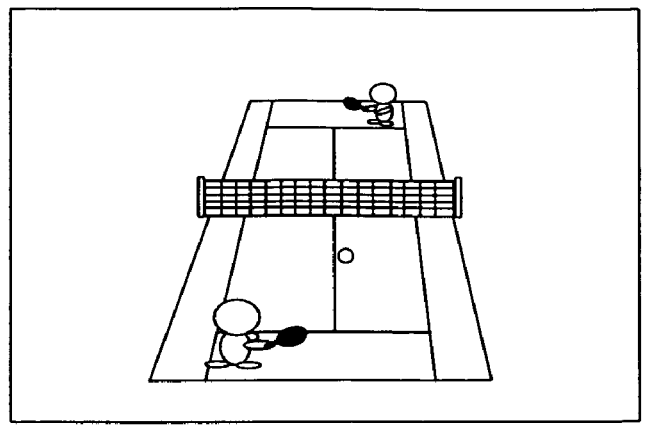
FIG. 23A, FIG. 23B and FIG. 23C show exemplary images of camera control.
Figure 23B:
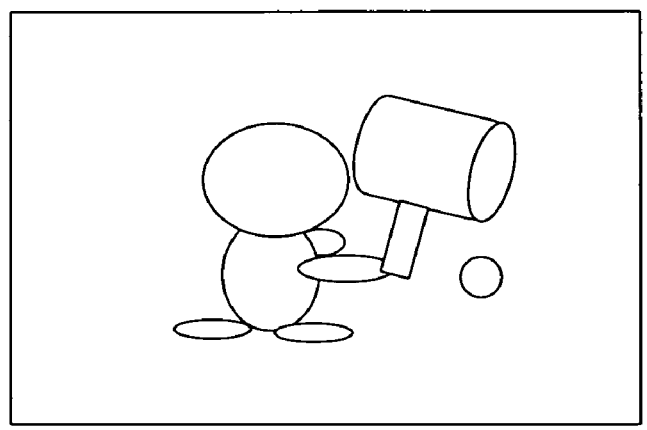
Figure 23C:
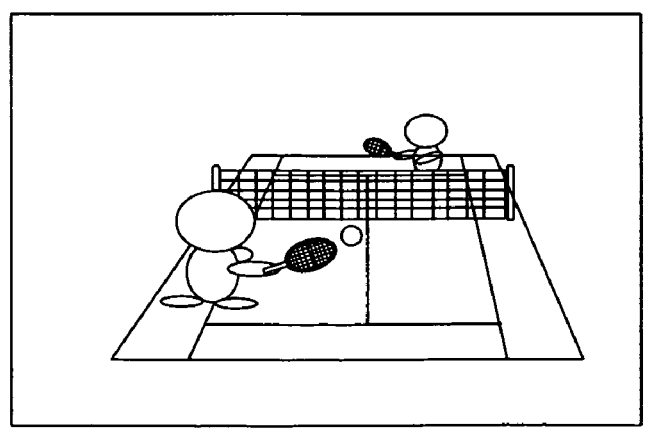

Regarding FIG. 22, the term "bird's-eye viewpoint" refers to a viewpoint, as shown in FIG. 23A, at which the camera takes an image of the entire game space seen from above. The term "zooming up" refers to the state, as shown in FIG. 23B, where the character 100$a$ performing the special shot motion is zoomed up. The term "rear viewpoint" refers to a viewpoint, as shown in FIG. 23C, at which the camera, located behind one of the characters, takes an image of both the character behind which the camera is located and the other character (the opponent).

FIG. 24 shows a special shot effect table (SS effect table). The SS effect table defines the moving parameters of the ball 102 after the shot motion is made for each type of special shot. Specifically, the SS effect table defines the initial speed, the initial direction and the spin as the moving parameters. Each moving parameter of the ball 102 after the shot motion is determined with reference to the SS effect table. Only for the offensive special shots, the SS effect table defines different parameters from those of the usual shot. The defensive special shots are meaningful in hitting the ball from the opponent character 100, which usually could not be returned, back to the opponent's court. Therefore, the moving parameters of the ball after being hit are not anything special. For the defensive special shots, however, different parameters from those of the usual shot may be defined.

FIG. 25 through FIG. 29 are flowcharts showing a flow of game processing executed by the CPU 22 and the GPU 24. When the game apparatus 14 is turned on, the CPU 22 executes a starting program stored on a boot ROM (not shown) to initialize the main memory 34 and the other elements. Then, the tennis game program stored on the optical disc 16 is read to the main memory 34 via the optical disc drive 54. Thus, the execution of the tennis game program is started.

Figure 25:
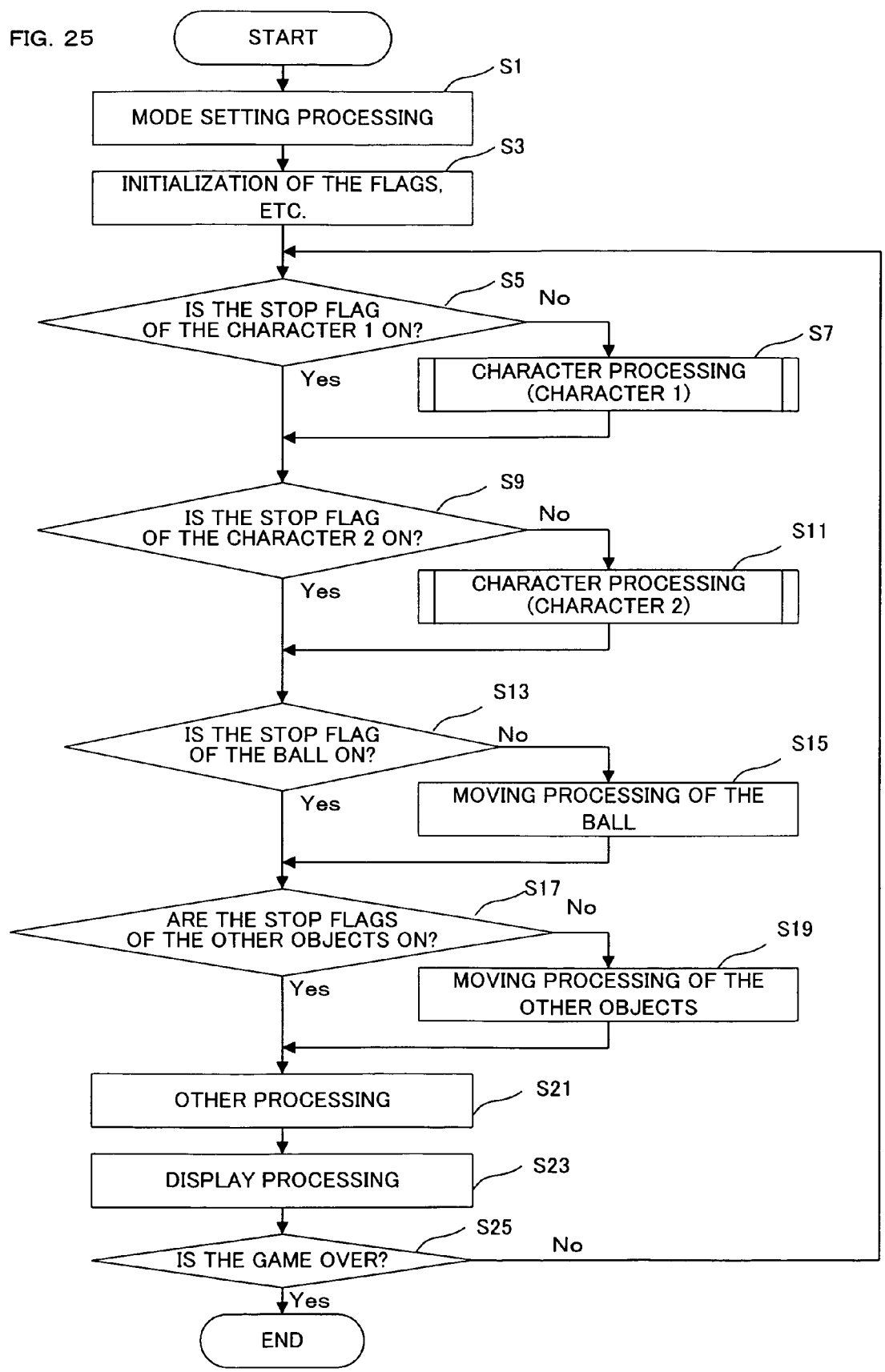
FIG. 25 is a flowchart of game processing.

As shown in FIG. 25, in step S1, before the start of the game, mode setting processing is executed. In this exemplary embodiment, the player can select one of three modes. In other exemplary embodiments, a mode may be automatically selected by the game apparatus. The three modes are "simple mode", "normal mode" and "technical mode". The required level of skill of game operations is lowest in the "simple mode" and highest in the "technical mode". The game operations described above with reference to FIG. 3 through FIG. 12C are the game operations in the "technical mode". In the "normal mode", the offensive special shot or the defensive special shot is automatically selected by the program. This will be described in more detail. In the "technical mode", the A button 20b and the R button 20c need to be simultaneously operated for causing the character to perform the offensive special shot, and the B button 20e and the R button 20c need to be simultaneously operated for causing the character to perform the defensive special shot. In the "normal mode", when the A button 20b and the R button 20c are simultaneously operated, either the offensive special shot or the defensive special shot is automatically selected by the program. Specifically, in the "normal mode", when the A button 20b and the R button 20c are simultaneously operated, it is first determined whether or not the ball 102 is present in the judgment area for the offensive special shot. When the ball 102 is present in the judgment area for the offensive special shot, the offensive special shot motion is performed. When the ball 102 is not present in the judgment area for the offensive special shot, it is determined whether or not the ball 102 is present in the judgment area for the defensive special shot. When the ball 102 is present in the judgment area for the defensive special shot, the defensive special shot motion is performed. When the ball 102 is not present in the judgment area for the defensive special shot, no shot motion is performed or an unsuccessful shot motion is performed. (As described above, these determinations are kept on conducted after the buttons are operated in addition to when the buttons are operated.) In the "normal mode", since the player does not need to select the offensive special shot or the defensive special shot, the game operations are easier.

In the "simple mode", when the A button 20b is operated (it is not necessary to simultaneously operate the R button 20c), it is determined whether or not the condition for performing a special shot motion is fulfilled (for example, whether or not the special shot gauge (SS gauge) is full). When the condition is fulfilled, the offensive special shot or the defensive special shot is automatically selected by the program, like when the A button 20b and the R button 20c are simultaneously operated in the "normal mode". When the condition is not fulfilled, the usual shot motion is performed. In the "simple mode", since it is not necessary to select the offensive special shot or the defensive special shot and further it is not necessary to select the usual shot or the special shot, the game operations are still easier.

After the mode selection described above is performed using a menu screen or the like, in step S3, the processing of initializing an SS gauge, a shot flag, a special shot flag (SS flag), a stop flag, and the setting of the virtual camera is executed.

In the tennis game in this exemplary embodiment, as described above, two players (player 1 and player 2) operate the respective characters (the character 100a and the character 100b). In the following description, the character 100a will be referred to as the character 1 and the character 100b will be referred to as the character 2. When it is not necessary to distinguish the character 1 and the character 2, the term "character" will be used. The variables initialized in step S3 are provided for each of the character 1 and the character 2, and all the variables are initialized. The stop flag is provided for each of the character 1 and the character 2 and also for the ball and the other objects.

The SS gauge is a variable representing the value of the SS power. In step S3, the value of the SS gauge of the character 1 and the value of the SS gauge of the character 2 are both set to zero.

The shot flag represents that the character is performing a shot motion. Namely, the shot flag is turned on when the player conducts a shot operation (when the player operates the A button 20b, operates the A button 20b while operating the R button 20c, or operates the B button 20e while operating the R button 20c). Once turned on, the shot flag is kept on until the shot motion (the usual shot motion or the special shot motion) is terminated, the Z button is operated, or the character scores. In step S3, the shot flag of the character 1 and the shot flag of the character 2 are both set to "off".

The SS flag shows that the character is performing a special shot motion. Namely, the SS flag is turned on when it is determined that the character should perform a special shot motion, and is kept on until the special shot motion is finished. In step S3, the SS flag of the character 1 and the SS flag is the character 2 are both set to "off".

The stop flag shows that the object is unmovable. While the stop flag is on, the motion of the object is at a stop. The flag is turned on while one character is performing a special shot motion. When the stop flag of a character is on, the motion of the character is at a stop, and the input operation by the player on the character for which the stop flag is on is not accepted. In step S3, the stop flag of character 1 and the stop flag of character 2 are both set to "off". In step S3, the stop flag of the ball and the stop flags of the other objects are also set to "off".

In step S3, the virtual camera is set to either the bird's-eye viewpoint or the rear viewpoint. Namely, the virtual camera is set so as to display the character 1 and the character 2 in the image. Whether the virtual camera is set to the bird's-eye viewpoint or the rear viewpoint is selected by the player using a menu screen or the like. In step S3, the other variables are also initialized.

After step S3, in step S5, it is determined whether the stop flag of the character 1 is on or not. When No (i.e., when the motion of the character 1 is not at a stop), in step S7, character processing will be executed on the character 1. The character processing will be described later with reference to FIG. 26 and FIG. 27. When Yes in step S5, or after step S7, in step S9, it is determined whether the stop flag of the character 2 is on or not. When No (i.e., when the motion of the character 2 is not at a stop), in step S11, the character processing will be executed on the character 2. When Yes in step S9, or after step S11, in step S13, it is determined whether the stop flag of the ball 102 is on or not. When No (i.e., when the usual motion of the ball 102 is not at a stop), in step S15, the processing of moving the ball 102 in the virtual space is executed. Specifically, moving processing of the ball 102 is executed based on the moving parameters of the ball 102 which are set by the service motion or the shot motion (including both the usual shot motion and the special shot motion) of the character. When Yes in step S13, or after step S15, in step S17, it is determined whether the stop flags of the other objects (spectator objects, judge objects, other movable non-living objects, etc.) are on or not. When No (i.e., when the motion of the other objects is not at a stop), in step S19, the moving processing of the other objects is executed. When Yes in step S17, or after step S19, in step S21, other processing is executed. Specifically, the processing of determining the shape of the light emitting object 106 based on the SS gauge value to locate the light emitting object 106 on the edge of the racket 101, and the processing of determining whether the character has scored or not (the processing of determining whether or not the ball 102 hit by a service motion or a shot motion of one character could be returned by the other character or whether or not the ball 102 hit by a service motion or a shot motion is out of the court, and thus adding a point), are executed.

After step S21, in step S23, display processing is executed. Specifically, the processing of displaying the image taken by the virtual camera on the TV 12 as a game image is executed. After step S23, in step S25, it is determined whether the game is over or not. When Yes, the game processing is terminated. When No, the procedure returns to step S5, where the game processing is repeated. Although not shown in the flowchart in FIG. 25, service processing is executed at the beginning of each set, and predetermined variables are initialized when each set is over.

Figure 26:
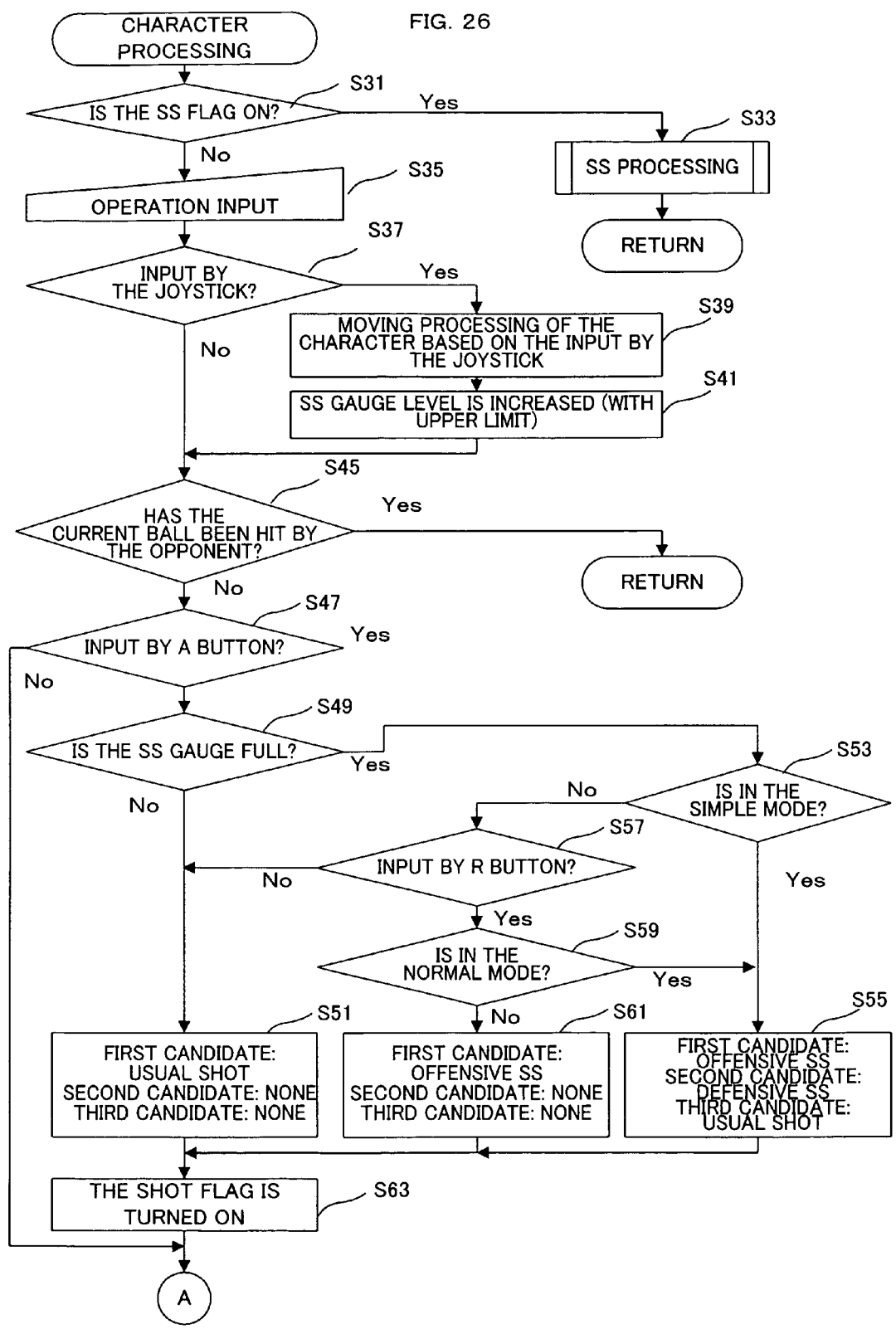
FIG. 26 is a detailed flowchart of character processing.
Figure 27:
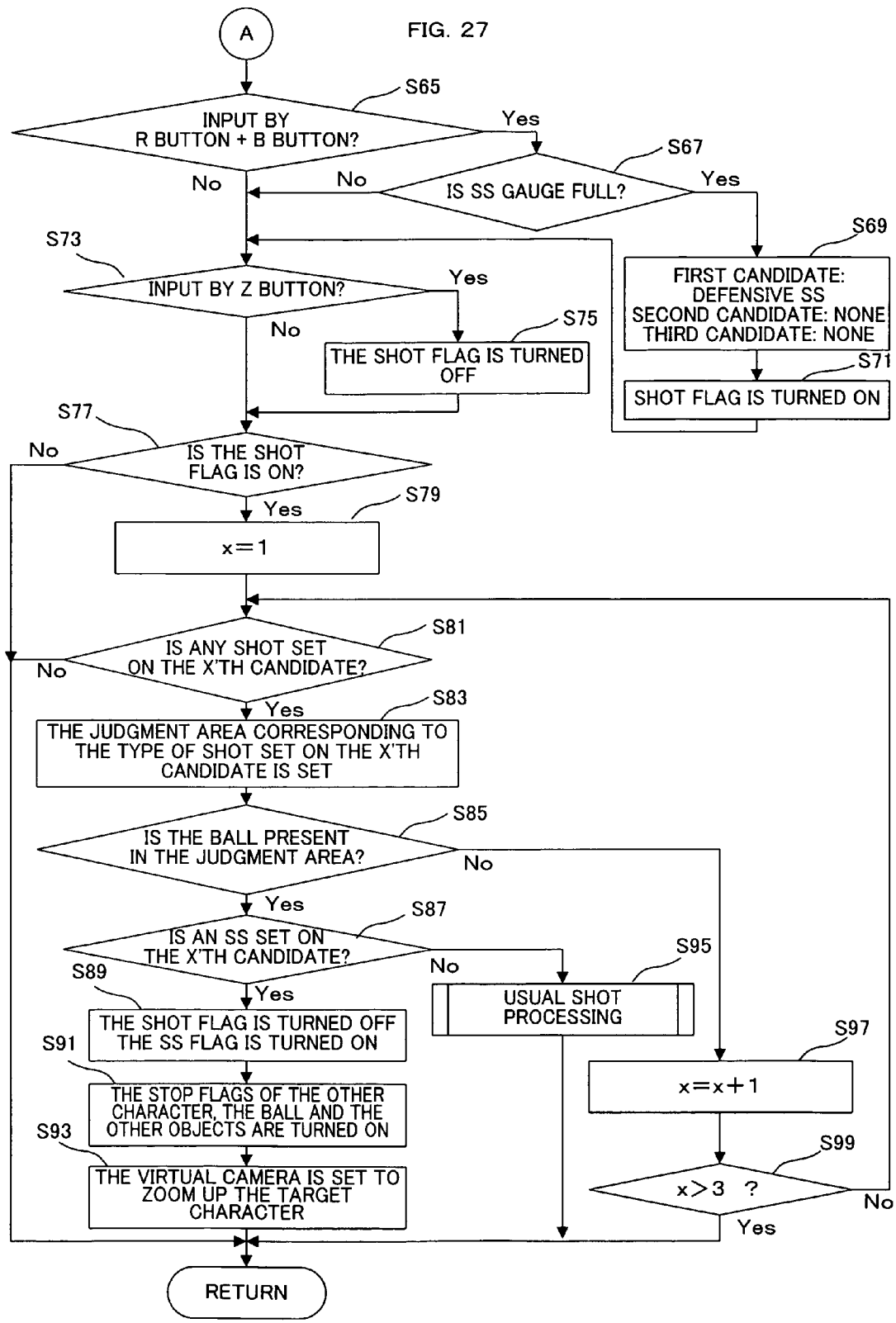
FIG. 27 is a detailed flowchart of character processing continued from FIG. 26.

FIG. 26 and FIG. 27 show a detailed flowchart of the character processing which is executed in steps S7 and S11 in FIG. 25. In the character processing, the character 1 or the character 2 is moved or caused to perform motions based on the inputs provided by the player 1 or the player 2.

The character processing is executed as follows. First in step S31, it is determined whether the SS flag of the character, that is currently a target of processing, is on or not. When the SS flag is on, in step S33, special shot processing (SS processing) is executed, and the character processing is terminated. Thus, the procedure returns to the processing in FIG. 25. The SS processing will be described later with reference to FIG. 29.

As described above, the character processing for the character 1 in step S7 and the character processing for the character 2 in step S11 are the same. The "character, that is currently a target of processing" is the character 1 in the character processing in step S7 and is character 2 in the character processing in step S11. In the following description of the character processing, the "character, that is currently a target of processing" will be referred to as a "target character".

When the SS flag is off, in step S35, the inputs provided to the controller (operation means) 20 by the player operating the target character are detected (the operation means 20 is provided for each player). Next, in step S37, it is determined whether an input has been made by the joystick 20a or not. When Yes, the procedure goes to step S39, where the moving processing of the target character is executed based on the input made by the joystick 20a. Specifically, the target character is moved in the virtual space coordinate system as follows: in the positive direction along the Z axis when the joystick 20a is turned upward, in the negative direction along the Z axis when the joystick 20a is turned downward, in the positive direction along the X axis when the joystick 20a is turned rightward, and in the negative direction along the X axis when the joystick 20a is turned leftward. The moving processing may be set such that when the shot flag is on in step S39, the target character is not moved or moved by a smaller amount than when the shot flag is on. After step S39, in step S41, the processing of increasing the SS gauge value of the target character by a predetermined level is executed. Namely, when the character moves, the SS gauge value is increased. The SS gauge value does not exceed the maximum value.

When No in step S37, or after step S41, in step S45, it is determined whether or not the current ball 102 has been hit by the opponent character by a shot motion (or a service motion). In the tennis game, the characters perform a shot motion alternately. In step S45, it is determined whether or not the target character is to perform a shot motion next. When Yes in step S45, shot processing is executed in steps S47 through S99. When No in step S45, the shot processing is not executed, and the character processing is terminated. Thus, the procedure returns to the processing in FIG. 25.

When Yes in step S45, in step S47, it is determined whether the A button 20b has been operated or not. When Yes, in step S49, it is determined whether the SS gauge is full or not. In the simple mode, in step S49, it is determined whether the target character will make the usual shot or a special shot. When the SS gauge is not full, in step S51, the processing of setting the usual shot as the first candidate and setting no second or third candidate is executed. The setting of the first through third candidates is used in steps S79 through S99 described later.

When the SS gauge is full, in step S53, it is determined whether the mode selected in step S1 is the simple mode or not. When the mode selected in step S1 is the simple mode, in step S55, the processing of setting the offensive special shot of the target character as the first candidate, the defensive special shot of the target character as the second candidate, and the usual shot as the third candidate is executed. (In FIG. 26 and FIG. 27, "special shot" is represented as "SS".) When the mode selected in step S1 is not the simple mode, in step S57, it is determined whether the R button 20c has been operated or not. In the normal mode, in step S57, it is determined whether the target character will make the usual shot or a special shot. When No in step S57, the procedure goes to step S51. When Yes in step S57, in step S59, it is determined whether the mode selected in step S1 is the normal mode or not. When the mode selected in step S1 is the normal mode, the procedure goes to step S55. When the mode selected in step S1 is not the normal mode (when the mode selected in step S1 is the technical mode), in step S61, the processing of setting the offensive special shot of the target character as the first candidate and setting no second or third candidate is executed. (As described above, in FIG. 26 and FIG. 27, "special shot" is represented as "SS".)

After step S51, S55 or S61, the procedure goes to step S63, where the processing of turning on the shot flag of the target character is executed. When No in step S47, or after step S63, the procedure goes to step S65 in FIG. 27.

In step S65, it is determined whether or not the R button 20c and the B button 20e have been simultaneously operated. When Yes, the procedure goes to step S67, where it is determined whether the SS gauge of the garget character is full or not. When the SS gauge is full, in step S69, the processing of setting the defensive special shot of the target character as the first candidate and setting no second or third candidate is executed. After step S69, the procedure goes to step S71, where the processing of turning on the shot flag is executed.

When No in step S65, when No in step S67, or after step S71, the procedure goes to step S73, where it is determined whether the Z button has been operated or not. When Yes, in step S75, the processing of turning off the shot flag is executed. This is for allowing a shot operation once input to be cancelled.

When No in step S73, or after step S75, in step S77, it is determined whether the shot flag of the target character is on or not. When the shot flag is off, the character processing is terminated and the procedure returns to the processing in FIG. 25. When the shot flag is on, in step S79, the processing of setting the variable x for loop processing to 1 is executed. After step S79, in step S81, it is determined whether or not any shot (the usual shot, the offensive special shot, or the defensive special shot) has been set on the x'th candidate in step S51, S55, S61 or S69. When no shot has been set, the character processing is terminated and the procedure returns to the processing in FIG. 25.

When a shot is set on the x'th candidate, in step S83, the processing of setting the judgment area corresponding to the shot set on the x'th candidate in the game space is executed based on the current position of the character with reference to the SS table in FIG. 15 (FIG. 18 through FIG. 21). After step S83, in step S85, it is determined whether the ball 102 is present in the judgment area or not. When the ball 102 is present in the judgment area, in step S87, it is determined whether the shot set on the x'th candidate is one of the offensive special shot and the defensive special shot. When one of the special shots is set on the x'th candidate, in step S89, the processing of turning on the SS flag and turning off the shot flag is executed. When the SS flag is turned on, in the step S31 in the next cycle of procedure, it is determined to be Yes, and in step S33, the processing of causing the target character to perform a special shot motion is executed. After step S89, in step S91, the processing of turning on the stop flags for the other character (the character that is not the target character), the ball 102 and the other objects is executed. By this, the moving processing of the other character, the ball 102 and the other objects is not executed as described above with reference to FIG. 25. Namely, motions thereof are stopped. As described above, the ball 102 may perform a specific motion.

After step S91, in step S93, the processing of setting the virtual camera so as to zoom up the target character is executed. Specifically, the virtual camera is set such that the viewing direction of the virtual camera is toward the target character and the target character is zoomed up. The camera position may be changed to the direction of becoming closer to the target character. After step S93, the character processing is terminated and the procedure returns to the processing in FIG. 25.

When it is determined in step S87 that the shot set on the x'th candidate is not a special shot, i.e., it is determined that the shot set on the x'th candidate is the usual shot, in step S95, the usual shot processing of causing the target character to perform the usual shot is executed. The usual shot processing will be described later with reference to FIG. 28. After step S95, the character processing is terminated and the procedure returns to the processing in FIG. 25.

When it is determined in step S85 that the ball 102 is not present in the judgment area, in step S97, the processing of adding 1 to the variable 1 is executed. Then, in step S99, it is determined whether the variable x exceeds 3 or not. When the variable x exceeds 3, the character processing is terminated and the procedure returns to the processing in FIG. 25. When the variable x is equal to or less than 3, the procedure returns to step S81 and the above-mentioned processing is repeated.

As described above, in steps S79 through S99, the following processing is executed. First, it is determined whether or not the ball 102 is present in the judgment area corresponding to the type of shot as the first candidate. When the ball 102 is present in the judgment area, the processing of causing the target character to perform the motion of the shot as the first candidate is executed. When the ball 102 is not present in the judgment area, it is determined whether or not the ball 102 is present in the judgment area corresponding to the type of shot as the second candidate. When the ball 102 is present in the judgment area, the processing of causing the target character to perform the motion of the shot as the second candidate is executed. When the ball 102 is not present in the judgment area, it is determined whether or not the ball 102 is present in the judgment area corresponding to the type of shot as the third candidate. When the ball 102 is present in the judgment area, the processing of causing the target character to perform the motion of the shot as the third candidate is executed. When the ball 102 is not present in the judgment area, the target character does not perform a shot motion. When no type of shot is set as the second or third candidate (no setting), the determination on the second or third candidate is not conducted.

As described above, in this exemplary embodiment, when the SS gauge is full in the simple mode, or when the operation of causing the character to perform a special shot is conducted in the normal mode, it is determined whether the ball 102 is present in the judgment area for each of the three types of shots as the first through third candidates. Thus, it is determined whether each shot motion is possible or not. Even if the shot as the first candidate is not possible, if the shot as the second candidate is possible, the shot as the second candidate is made. Even if the shot as the second candidate is not possible, if the shot as the third candidate is possible, the shot as the third candidate is made. As described above, the judgment area for each type of shot is different, and the judgment area is not displayed on the screen. Accordingly, it is difficult for the player to accurately grasp the judgment area for each type of shot. It is considered to be very difficult for the player to determine which type of shot can be made on the ball hit by the opponent by various types of shots, each time the ball is hit by the opponent. For example, in the technical mode, even if the player intends to make an offensive special shot, the player may fail in making such a shot because the ball 102 is not present in the judgment area for the offensive special shot. Such a mistake not intended by the player never makes the game more exciting or amusing, but rather may make the player feel unpleasant. However, in the simple mode or the normal mode provided in this exemplary embodiment, even if the shot intended by the player is impossible, if another shot is possible, such a possible shot is made. Therefore, the number of mistakes not intended by the player can be reduced and thus the operability can be improved.

Figure 28:
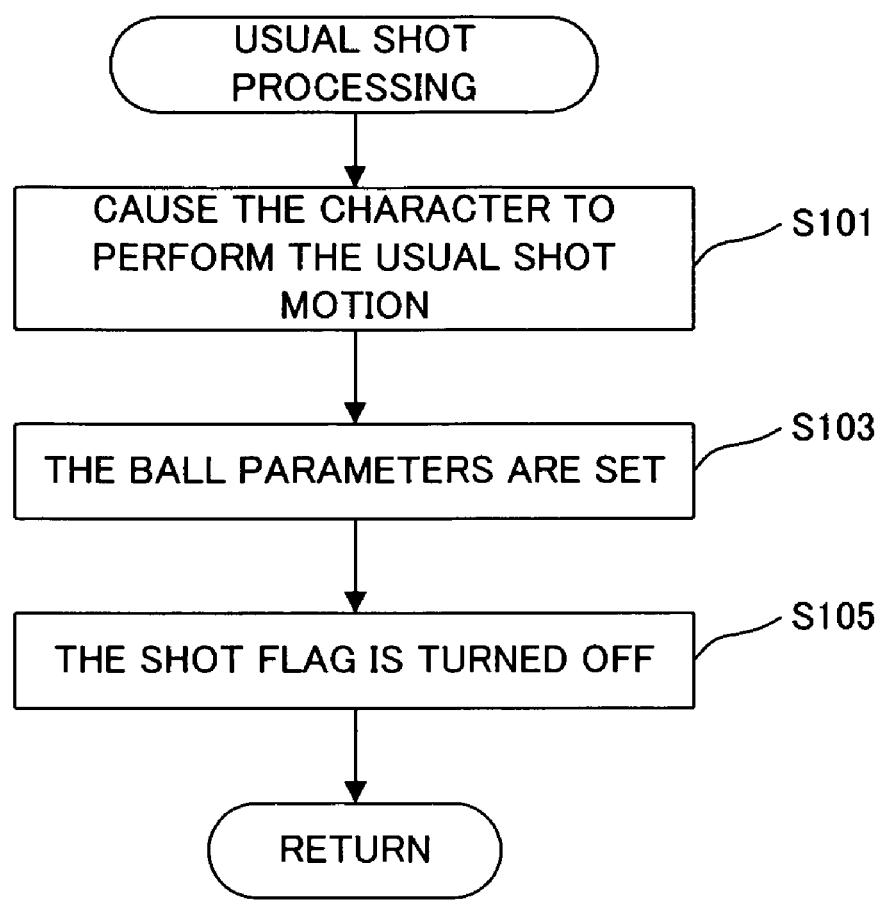
FIG. 28 is a detailed flowchart of usual shot processing.

FIG. 28 is a detailed flowchart showing the usual shot processing executed in step S95 in FIG. 27. In the usual shot processing, the processing of causing the target character (character 1 or character 2) to perform the usual shot motion is executed.

First, in step S101, the processing of causing the target character to perform the usual shot motion is executed. Then, in step S103, the processing of setting the moving parameters of the ball 102 is executed in accordance with the shot motion performed in step S101. Specifically, the values of the initial speed, the initial speed, and the spin are set. After S103, in step S105, the processing of turning off the shot flag is executed, and the usual shot processing is terminated. Thus, the procedure returns to the processing in FIG. 27.

Figure 29:
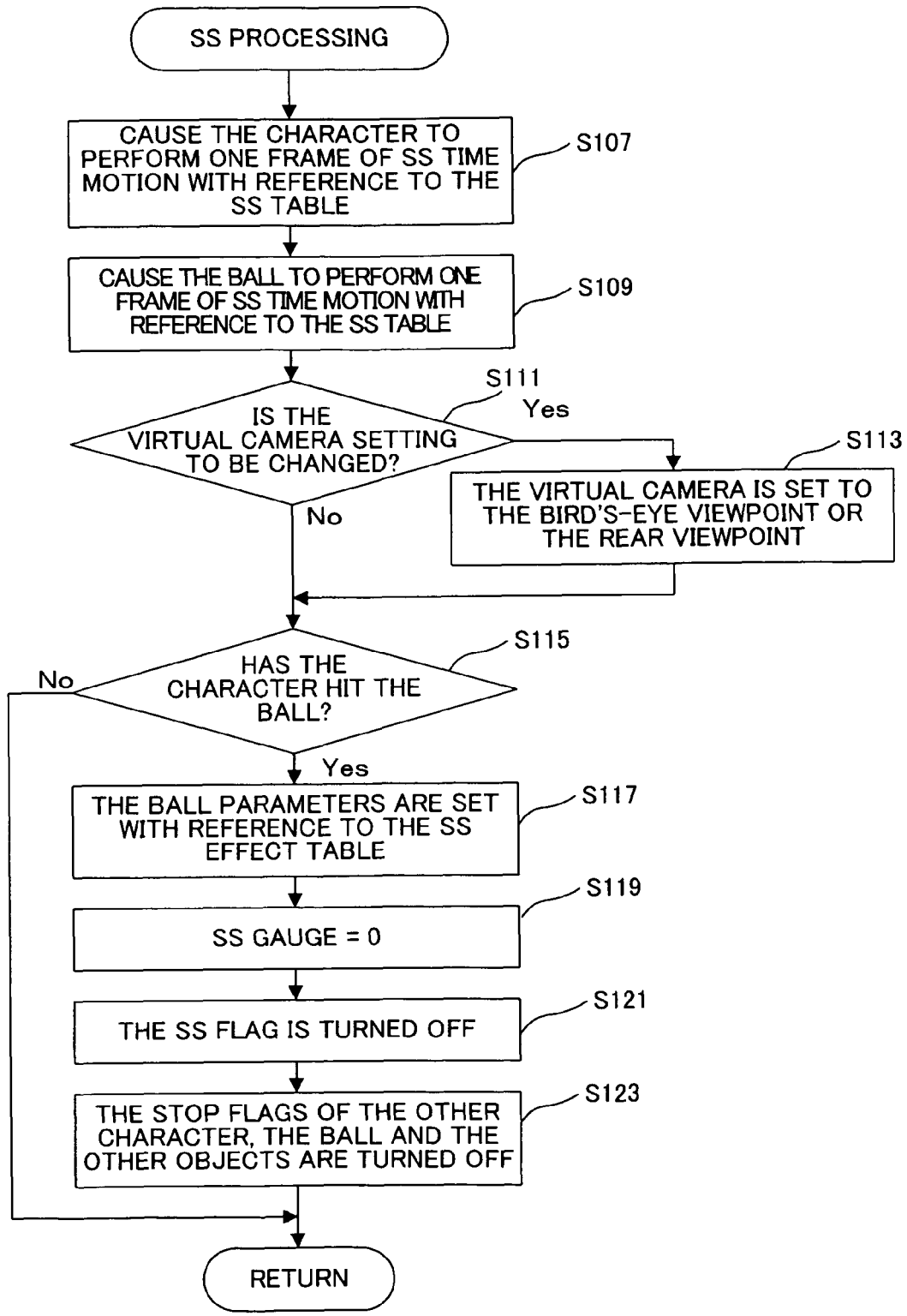
FIG. 29 is a detailed flowchart of SS processing.

FIG. 29 is a detailed flowchart showing the SS processing executed in step S33 in FIG. 26. In the SS processing, the processing of causing the target character to perform a special shot motion is executed. First, in step S107, the character is caused to perform an SS time motion, which corresponds to one frame, with reference to the SS table shown in FIG. 15. An "SS time motion" is performed while the motions of the other objects are at a stop. An SS time motion of the target character is a motion for making a special shot motion. Specifically, the target character performs the SS time motions of adjusting the relative position thereof with respect to the ball (FIG. 9A through FIG. 9D, FIG. 11). When a predetermined positional relationship of the character and the ball is obtained by adjusting the position, the motion of hitting the ball with the racket is performed. The predetermined positional relationship is such a positional relationship that when the character swings the racket, the racket contacts the ball.

Next, in step S109, the ball is caused to perform an SS time motion, which corresponds to one frame, with reference to the SS table. Specifically, the ball performs SS time motions of adjusting the relative position thereof with respect to the target character (FIG. 10A through FIG. 10D). Such SS time motions of the ball are performed until the above predetermined positional relationship of the ball and the character is obtained. When the SS table defines that the ball is at a stop, no processing is executed in step S109. After step S109, in step S111, it is determined whether the virtual camera setting should be switched or not, with reference to the virtual camera control table shown in FIG. 22. When it is determined that the virtual camera setting should be switched, in step S113, the virtual camera is set to the bird's-eye viewpoint or the rear viewpoint as in step S3 in FIG. 25. The virtual camera setting is preferably switched before the racket and the ball contact each other. Namely, the game apparatus 14 preferably returns the setting of the virtual camera to the usual state before the racket and the ball contact each other. By this, the virtual camera has been returned to the pre-shot setting when the sub motion of hitting the ball is performed and the ball starts moving in accordance with the hitting sub motion. Therefore, the change of the setting of the virtual camera does not affect the game operations after the shot motion.

In this exemplary embodiment, in steps S107 and S109, the processing of adjusting the relative positions of the character and the ball is executed. This processing is not based on the instruction to move which is input by the player to the controller 20. In this exemplary embodiment, while the processing of adjusting the relative positions of the character and the ball is being executed, the instruction to move which is input by the player to the controller 20 is ignored. In other words, the game apparatus 14 does not execute the moving processing based on the instruction to move from the controller while the positional adjustment is being executed (during the steps S107 and S109). In other exemplary embodiments, the game apparatus may be set such that the instruction to move from the controller is accepted while the positional adjustment is being executed and that the positional adjustment reflecting the instruction to move is conducted. In other words, the game apparatus may be set such that in the positional adjustment, the post-movement position of the character (or the ball) is varied in accordance with the instruction to move.

In other exemplary embodiments, when the an SS time motion of the character is performed (specifically, after step S107 or after step S109), effect display may be provided for presenting special effects. For example, the area surrounding the position at which the racket hits the ball may be lit up or indicated by an object such as a star or a flower petal. This can further enhance the dramatic effect of the special shot motion. The positional adjustment in step S109 may be executed while the effect display is being provided. In more detail, the ball is hidden so as not to be displayed (or so as not to be seen easily) on the screen by the effect display, during which time the ball is moved. When it appears unnatural that the "ball moves ignoring the moving parameters" for a reason related to the game setting, the ball can appear naturally moved using the effect display as described above.

When No in step S111, or after step S113, in step S115, it is determined whether the character has hit the ball or not. Namely, it is determined whether or not the racket and the ball have contacted each other by the shot motion of the character. When it is determined that the character has not hit the ball, the SS processing is terminated and the procedure returns to the processing in FIG. 26.

When it is determined that the character has hit the ball, in step S117, the processing of setting the parameters of the ball is executed, with reference to the SS effect table shown in FIG. 24. After step S117, the SS gauge of the target character is set to zero in step S119, the SS flag is turned off in step S121, and the stop flags for the other character, the ball and the other objects are turned off in step S123. Then, the SS processing is terminated and the procedure returns to the processing in FIG. 26.

The SS flag is kept on until it is determined that the target character has hit the ball in step S115. Therefore, until it is so determined, the target character continues performing the sub motions for the special shot motion, the ball is kept at a stop or continues to perform SS time motions, and the other character and the other objects are kept at a stop.

For switching the setting of the virtual camera in steps S93 and S113, the processing of gradually changing the position, the viewing direction and the viewing angle may be executed. In the usual shot processing shown in FIG. 28, one frame of moving processing is executed in each frame, although only described briefly.

In this exemplary embodiment, throughout the entire period in which one character is performing a special shot motion, the motions of the other character, the ball and the other objects are at a stop. Alternatively, the motions of the other character, the ball and the other objects may be at a stop in a part of the period in which one character is performing a special shot motion. For example, the motions of the other character, the ball and the other objects may be at a stop, only while the virtual camera is in the state of zooming up the target character, for a predetermined period of time after the start of the special shot motion, or until the target character finishes a predetermined sub motion (for example, the sub motion of swinging up the racket) after the start of the special shot motion. Until when the motions of the other character, the ball and the other objects are kept at a stop may be defined for each type of special shot. It is not absolutely necessary that the motions of the other character, the ball and the other objects are at a stop during the special shot motion.

In this exemplary embodiment, the tennis game is described as an example. The certain exemplary embodiments described herein are applicable to any game in which a to-be-hit object (such as a ball) is hit by a character object (using the hand, foot or other part of the body of the character object, or using a tool). For example, when the certain exemplary embodiments described herein are applied to a soccer game, a usual shoot and a special shoot having different judgment areas may be prepared as the shoot motions performable by the character, and the position of the character or the ball may be adjusted at the time of the special shoot.

While certain exemplary embodiments have been described in detail, the foregoing description is in all aspects illustrative and not restrictive. It is understood that numerous other modifications and variations can be devised without departing from the scope of these certain exemplary embodiments.

What is claimed is:

1. A non-transitory storage medium which stores a game program for causing a computer of a game apparatus causing a character object appearing in a virtual game space to perform a hitting motion on a to-be-hit object so as to move the to-be-hit object in the virtual game space to perform:

causing the character object to perform a first type of hitting motion on the necessary condition that the to-be-hit object is present in a first area which is set based on a position of the character object in the virtual game space and which moves in accordance with movement of the character object;

causing the character object to perform a second type of hitting motion, which is different from the first type of hitting motion, on the necessary condition that the to-behit object is present in a second area which is set based on the position of the character object in the virtual game space and which moves in accordance with movement of the character object, the second area shaving a different size than the first area; and adjusting a position of at least one of at least a part of the character object and the to-be-hit object, such that when the character object is caused to perform the second type of hitting motion, at least the part of the character object and the to-be-hit object are in a predetermined positional relationship.

2. A storage medium according to claim 1, wherein the game program causes the computer to further perform:
   determining whether or not the character object should perform the second type of hitting motion; and
   when it is determined that the character object should perform the second type of hitting motion, temporarily stopping a motion of at least the to-be-hit object;
   wherein the position is adjusted by moving at least the part of the character object while the motion of the first to-be-hit object is at a stop.

3. A storage medium according to claim 1, wherein the game program causes the computer to further perform:
   determining whether or not the character object should perform the second type of hitting motion; and
   when it is determined that the character object should perform the second type of hitting motion, temporarily stopping a motion of objects other than the to-be-hit object;
   wherein the position is adjusted by moving the to-be-hit object while the motion of the objects other than the to-be-hit object are at a stop.

4. A storage medium according to claim 1, wherein the game program causes the computer to further perform:
   determining whether or not the character object should perform the second type of hitting motion; and
   when it is determined that the character object should perform the second type of hitting motion, temporarily stopping a motion of objects other than the character object and the to-be-hit object;
   wherein the position is adjusted by moving at least the part of the character object and the to-be-hit object while the motion of the objects other than the character object and the to-be-hit object are at a stop.

5. A storage medium according to claim 1, wherein the second area encompasses an area which is not encompassed in the first area.

6. A storage medium according to claim 1, wherein:
   the character object includes a human object and a hitting object that the human object has; and
   the hitting object is moved such that the hitting object contacts the to-be-hit object.

7. A storage medium according to claim 1, wherein, in response to performance of a predetermined operation, the character object performs the second type of hitting motion on the condition that the to-be-hit object is present in the second area when and after the predetermined operation is performed.

8. A storage medium according to claim 1, wherein:
   the second type of hitting motion is performable only when a predetermined parameter on the character object fulfills a predetermined condition; and
   the game program causes the computer to further perform, in response to a predetermined operation being performed and when the predetermined condition is fulfilled, causing the character object to perform the second type of hitting motion, whereas when the predetermined condition is not fulfilled, causing the character object to perform the first type of hitting motion.

9. A storage medium according to claim 1, wherein:
   the second type of hitting motion is performable only when a predetermined parameter on the character object fulfills a predetermined condition; and
   the game program causes the computer to further perform:
   allowing a player to set, or automatically setting, a first mode or a second mode;
   in the state where the first mode is set and in response to a first operation being performed, when the predetermined condition is fulfilled, causing the character object to perform the second type of hitting motion, and when the predetermined condition is not fulfilled, causing the character object to perform the first type of hitting motion; and
   in the state where the second mode is set and in response to the first operation being performed, causing the character object to perform the first type of hitting motion, and in response to a second operation being performed, which is different from the first operation, causing the character object to perform the second type of hitting motion.

10. A storage medium according to claim 1, wherein the game program causes the computer to further perform:
    determining whether or not the to-be-hit object is present in one of first area and the second area, in response to a predetermined operation being performed; and
    when it is determined that the to-be-hit object is not present in the one of first area and the second area, determining whether or not the to-be-hit object is present in the other of the first area and the second area;
    wherein:
    when it is determined that the to-be-hit object is present in the first area, the character object performs the first type of hitting motion; and
    when it is determined that the to-be-hit object is present in the second area, the character object performs the second type of hitting motion.

11. A storage medium according to claim 1, wherein the game program causes the computer to further perform:
    causing the character object to perform a third type of hitting motion which is different from the first type of hitting motion and the second type of hitting motion, on the necessary condition that the to-be-hit object is present in a third area which is set based on the position of the character object in the virtual game space;
    determining whether or not the to-be-hit object is present in one of the second area and the third area, in response to a predetermined operation being performed; and
    when it is determined that the to-be-hit object is not present in the one of second area and the third area, determining whether or not the to-be-hit object is present in the other of the second area and the third area;
    wherein:
    when it is determined that the to-be-hit object is present in the second area, the character object performs the second type of hitting motion;
    when it is determined that the to-be-hit object is present in the third area, the character object performs the third type of hitting motion; and
    a position of at least one of at least a part of the character object and the to-be-hit object is adjusted such that when the character object is caused to perform the third type of hitting motion, at least the part of the character object and the to-be-hit object are in a predetermined positional relationship.

12. A game apparatus for causing a character object appearing in a virtual game space to perform a hitting motion on a to-be-hit object so as to move the to-be-hit object in the virtual game space, the game apparatus comprising:
- first motion programmed logic circuitry for causing the character object to perform a first type of hitting motion on the necessary condition that the to-be-hit object is present in a first area which is set based on the position of the character object in the virtual game space and which moves in accordance with movement of the character object;
- second motion programmed logic circuitry for causing the character object to perform a second type of hitting motion, which is different from the first type of hitting motion, on the necessary condition that the to-be-hit object is present in a second area which is set based on the position of the character object in the virtual game space and which moves in accordance with movement of the character object, the second area having a different size than the first area; and
- adjustment programmed logic circuitry for adjusting a position of at least one of at least a part of the character object and the to-be-hit object, such that when the character object is caused to perform the second type of hitting motion, at least the part of the character object and the to-be-hit object are in a predetermined positional relationship.

13. A method for operating a game apparatus to cause a character object appearing in a virtual game space to perform a hitting motion on a to-be-hit object so as to move the to-be-hit object in the virtual game space, comprising:
- causing, by a processor, the character object to perform a first type of hitting motion on the necessary condition that the to-be-hit object is present in a first area which is set by the processor based on a position of the character object in the virtual game space and which moves in accordance with movement of the character object;
- causing, by the processor, the character object to perform a second type of hitting motion, which is different from the first type of hitting motion, on the necessary condition that the to-be-hit object is present in a second area which is set based on the position of the character object in the virtual game space and which moves in accordance with movement of the character object, the second area having a different size than the first area; and
- adjusting a position of at least one of at least a part of the character object and the to-be-hit object, by the processor, such that when the character object is caused to perform the second type of hitting motion, at least the part of the character object and the to-be-hit object are in a predetermined positional relationship.

14. A game apparatus for causing a character object appearing in a virtual game space to perform a hitting motion on a to-be-hit object so as to move the to-be-hit object in the virtual game space, the game apparatus comprising:
- a processor;
- a memory coupled to said processor, said memory storing instructions that, when executed by said processor, control said processor to:
- cause the character object to perform a first type of hitting motion on the necessary condition that the to-be-hit object is present in a first area which is set based on the position of the character object in the virtual game space and which moves in accordance with movement of the character object;
- cause the character object to perform a second type of hitting motion, which is different from the first type of hitting motion, on the necessary condition that the to-be-hit object is present in a second area which is set based on the position of the character object in the virtual game space and which moves in accordance with movement of the character object, the second area having a different size than the first area; and
- adjust a position of at least one of at least a part of the character object and the to-be-hit object, such that when the character object is caused to perform the second type of hitting motion, at least the part of the character object and the to-be-hit object are in a predetermined positional relationship.

\* \* \* \* \*